(12) United States Patent
Gu et al.

(10) Patent No.: US 11,996,704 B2
(45) Date of Patent: May 28, 2024

(54) ELECTRONIC DEVICE RECEIVING WIRELESS POWER

(71) Applicant: Samsung Electronics Co., Ltd., Gyeonggi-do (KR)

(72) Inventors: Beomwoo Gu, Gyeonggi-do (KR); Jaehyun Park, Gyeonggi-do (KR); Chongmin Lee, Gyeonggi-do (KR); Bohwan Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 87 days.

(21) Appl. No.: 17/523,476

(22) Filed: Nov. 10, 2021

(65) Prior Publication Data
US 2022/0158492 A1  May 19, 2022

Related U.S. Application Data

(63) Continuation of application No. PCT/KR2021/014795, filed on Oct. 21, 2021.

(30) Foreign Application Priority Data

Nov. 18, 2020 (KR) .......................... 10-2020-0154941
May 21, 2021 (KR) .......................... 10-2021-0065693

(51) Int. Cl.
*H02J 50/12* (2016.01)
*H01F 27/42* (2006.01)

(52) U.S. Cl.
CPC .............. *H02J 50/12* (2016.02); *H01F 27/42* (2013.01); *H02J 2310/22* (2020.01)

(58) Field of Classification Search
CPC ...................................................... H02J 50/12
See application file for complete search history.

(56) References Cited

U.S. PATENT DOCUMENTS

| 4,479,175 A | 10/1984 | Gille et al. |
| 2006/0132194 A1 | 6/2006 | Harriman |

(Continued)

FOREIGN PATENT DOCUMENTS

| CN | 105680577 | 6/2016 |
| CN | 109818427 | 5/2019 |

(Continued)

OTHER PUBLICATIONS

International Search Report dated Jan. 28, 2022 issued in counterpart application No. PCT/KR2021/014795, 10 pages.

(Continued)

*Primary Examiner* — Daniel Kessie
(74) *Attorney, Agent, or Firm* — The Farrell Law Firm, P.C.

(57) ABSTRACT

A wireless power receiver receiving power from a wireless power transmitter is provided. The receiver includes a resonance circuit, a rectifier circuit, and a driver circuit. The resonance circuit includes first and second coils and a first capacitor. The rectifier circuit includes first and second rectifier circuits. The first rectifier circuit includes first through fourth MOSFETs. Sources of the first and second MOSFETs are connected to ends of a resonator including the first coil and the first capacitor. Sources of the third and fourth MOSFETs are connected to ground. The driver circuit is connected to gates of the first through fourth MOSFETs, When the driver circuit switches off the first and second MOSFETs and switches on the third and fourth MOSFETs, as currents are induced in the resonator and the second coil, the resonance circuit receives the wireless power, and the current induced in the second coil is rectified by the second rectifier circuit.

20 Claims, 16 Drawing Sheets

(56) References Cited

U.S. PATENT DOCUMENTS

| | | | |
|---|---|---|---|
| 2006/0261142 | A1 | 11/2006 | McKenzie |
| 2013/0099591 | A1 | 4/2013 | Yeo et al. |
| 2014/0368052 | A1 | 12/2014 | Norconk et al. |
| 2015/0207338 | A1 | 7/2015 | Uchimoto et al. |
| 2016/0294221 | A1 | 10/2016 | Maniktala |
| 2017/0005525 | A1 | 1/2017 | Lecas et al. |
| 2018/0062445 | A1 | 3/2018 | Hwang et al. |
| 2018/0304755 | A1 | 10/2018 | Beaver et al. |
| 2019/0157910 | A1 | 5/2019 | Choi et al. |
| 2020/0274402 | A1* | 8/2020 | Hwang .................. H02J 50/12 |
| 2022/0037935 | A1 | 2/2022 | Mehas |

FOREIGN PATENT DOCUMENTS

| | | |
|---|---|---|
| JP | 2010-263683 | 11/2010 |
| JP | 2016-111819 | 6/2016 |
| KR | 10-2007-0119132 | 12/2007 |
| KR | 10-2013-0044647 | 5/2013 |
| KR | 1020160108031 | 9/2016 |
| KR | 1020160111482 | 9/2016 |
| KR | 1020180012675 | 2/2018 |

OTHER PUBLICATIONS

Indian Examination Report dated Jan. 24, 2024 issued in counterpart application No. 202337019964, 6 pages.
European Search Report dated Feb. 21, 2024 Issued in counterpart application No. 21894908.9-1202, 11 pages.

\* cited by examiner

ELECTRONIC DEVICE RECEIVING WIRELESS POWER

CROSS-REFERENCE TO RELATED APPLICATION(S)

This application is a bypass continuation of International Application No. PCT/KR2021/014795, which was filed on Oct. 21, 2021, and is based on and claims priority under 35 U.S.C. § 119 to Korean Patent Application No. 10-2020-0154941, which was filed in the Korean Intellectual Property Office on Nov. 18, 2020, and Korean Patent Application No. 10-2021-0065693, which was filed in the Korean Intellectual Property Office on May 21, 2021, the entire disclosure of each of which is incorporated herein by reference.

BACKGROUND

1. Field

The disclosure relates generally to an electronic device receiving wireless power, and more particularly, to a wireless power receiver having a bidirectional switch.

2. Description of Related Art

Wireless charging technology that uses an electromagnetic induction scheme or a magnetic resonance scheme has been utilized on electronic devices such as smart phones. When a power transmitting unit (PTU) (e.g., a wireless charging pad) and a power receiving unit (PRU) (e.g., a smart phone) come into contact with each other or approach each other within a certain distance, a battery of the PRU may be charged by electromagnetic induction or electromagnetic resonance between a transmitting coil of the PTU and a receiving coil of the PRU.

FIG. 1 is a circuit diagram illustrating a wireless power receiver performing wireless charging. A wireless power receiver 100 may include a resonance circuit 110, a first rectifier circuit 130, a second rectifier circuit 140, a capacitor 151, a low drop-output (LDO) regulator 152, a charger 153, a battery 154, a switching circuit 170, and a controller 180. The resonance circuit 110 may include a first coil 111, a first capacitor 112, a second coil 113, and a bidirectional switch 120. The second coil 113 may be a coil having an inductance that is smaller than that of the first coil 111. The first coil 111 may be a receiver (RX) resonant coil forming parallel resonance with the first capacitor 112, and the second coil 113 may be an RX auxiliary coil or feeding coil connected to the second rectifier circuit 140. The first coil 111 and the second coil 113 may be magnetically coupled to each other, such that a mutual inductance Mf may be formed between the first coil 111 and the second coil 113. Due to the formed mutual inductance Mr, a voltage may be induced in the second coil 113 that is a voltage induced in the first coil 111 increased by a goodness Q of the resonance circuit. A current may then flow through the second rectifier circuit 140 due to the voltage induced in the second coil 113.

As will be described in greater detail below with reference to FIGS. 2A and 2B, a connection state between the first coil 111, the first capacitor 112, and the second coil 113, constituting the resonance circuit 110, may differ with an on/off state of the bidirectional switch 120, and wireless power received by the resonance circuit 110 from the wireless power transmitter and transmitted to the second rectifier circuit 140 and the first rectifier circuit 130 may differ with the connection state between the first coil 111, the first capacitor 112, and the second coil 113.

The bidirectional switch 120 may include two or more switches (e.g., a first switch 121 and a second switch 122). Each of the first switch 121 and the second switch 122 may be an N-channel metal-oxide semiconductor field-effect-transistor (MOSFET), and a first diode 123 and a second diode 124 may be a body diode of the first switch 121 and a body diode of the second switch 122, respectively. The first switch 121 and the second switch 122 may have a common source voltage by having respective resources serially connected at a node 127. A common gate voltage with the common source voltage as a reference voltage may be applied to a gate of each of the first switch 121 and the second switch 122, under control of a gate driver circuit 160. For example, an induced voltage may be formed in the first coil 111 based on a high resonant frequency (e.g., 6.78 MHz), such that source voltages of the first switch 121 and the second switch 122 may be alternated depending on a high frequency (e.g., 6.78 MHz). By applying the gate voltage with the common source voltage as the reference voltage to the gate of each of the first switch 121 and the second switch 122, the on/off states of the first switch 121 and the second switch 122 may be stably controlled. Applying the gate voltage or applying (or outputting) a driving signal may mean applying a voltage exceeding each threshold voltage to the gates of the first switch 121 and the second switch 122. Not applying the gate voltage or not applying the driving signal may mean applying a voltage that does not exceed each threshold voltage to the gates of the first switch 121 and the second switch 122. When the gate voltage is applied to the gate of each of the first switch 121 and the second switch 122, the first switch 121 and the second switch 122 may be switched to an "on" state and both ends of the bidirectional switch 120 may be electrically connected. When the gate voltage is not applied to the gate of each of the first switch 121 and the second switch 122, the first switch 121 and the second switch 122 may be switched to an "off" state and an electrical connection path between both ends of the bidirectional switch 120 may be cut off.

The first rectifier circuit 130 may include a third diode 131, a fourth diode 132, and/or a capacitor 133. When the first and switch 121 and the second switch 122 are switched from the "on" state to the "off" state, upon application of a voltage of a predetermined magnitude or greater to the both ends of the first switch 121 and the second switch 122, the third diode 131 and the fourth diode 132 may operate to rectify an induced voltage, and thus, apply the rectified voltage as a both-end voltage of the capacitor 133. The capacitor 133 may be charged with the voltage rectified by the third diode 131 and the fourth diode 132. The capacitor 133 may be connected to the node 127 of the first switch 121 and the second switch 122, and may be applied at one end thereof with the source voltages of the first switch 121 and the second switch 122.

After the capacitor 133 is charged with the voltage rectified by the third diode 131 and the fourth diode 132 or a voltage spike generated in both ends of the first switch 121 and the second switch 122, charged energy may be discharged through at least one resistor connected in parallel to the capacitor 133.

The second rectifier circuit 140 may include four diodes 141, 142, 143, and 144, and rectify the induced voltage to apply the rectified voltage as a both-end voltage of the capacitor 151.

The first rectifier circuit 130 may form an energy harvesting circuit that charges the capacitor 133. The energy harvesting circuit may include the first rectifier circuit 130, a Zener diode $D_{z1}$ 101 connected in parallel to the capacitor 133, and a Zener diode $D_{z2}$ 103. One end of each of the capacitor 133, the Zener diode $D_{z1}$ 101, and the Zener diode $D_{z2}$ 103 may be connected to the node 127 that is the common source of the first switch 121 and the second switch 122.

The Zener diode 101 may regulate the rectified voltage applied to the capacitor 133 to a predetermined voltage (e.g., a Zener breakdown voltage of the Zener diode 101) or less. A resistor $R_g$ 102 may be a gate resistor of the first switch 121 and the second switch 122, and a capacitor $C_{gs}$ 104 may be a gate-source capacitor of the first switch 121 and the second switch 122. The energy harvesting circuit may further include the Zener diode $D_{z2}$ 103 connected in parallel to a gate and a source of the first switch 121 and/or a gate and a source of the second switch 122. The Zener diode 103 may regulate the voltage applied to the capacitor 104 to a predetermined voltage (e.g., a Zener breakdown voltage of the Zener diode 103) or less. The switching circuit 170 may include an opto-coupler $Q_{C1}$ 175 and a switch $Q_{C2}$ 176. A diode 177 may be a body diode of the switch 176. The optocoupler 175 may include a light-emitting diode (LED) 171 and a photodiode 173. A resistor RP 174 may be an internal resistor of the photodiode 173. A resistor $R_C$ 172 may be an internal resistor of the LED 171 of the optocoupler 175.

The switching circuit 170 may be provided with a first control signal from the controller 180 in the form of a voltage $V_{con}$ applied to the switch 176 of the optocoupler 175. The controller 180 may be supplied with power for applying the voltage $V_{con}$ from the battery 154 at all times. The controller 180 may be supplied with power for applying the voltage $V_{con}$ based on the LDO regulator 152 when receiving wireless power.

The controller 180 may compare a rectified voltage $V_{rec}$ of an output end of the second rectifier circuit 140 with a threshold, and apply the voltage $V_{con}$ to the switch 176 based on a comparison result. The controller 180 may apply the voltage $V_{con}$ exceeding a threshold voltage of the switch 176 when determining that the rectified voltage $V_{rec}$ at the output end of the second rectifier circuit 140 is greater than or equal to the threshold. The optocoupler 175 may operate based on the voltage $V_{con}$ applied from the controller 180 to the switch 176. When a magnitude of the voltage $V_{con}$ applied from the controller 180 to the switch 176 exceeds the threshold voltage of the switch 176, the switch 176 may be switched to the "on" state, such that the LED 171 may be connected to the ground through the switch 176. As the LED 171 is connected to the ground through the switch 176, the LED 171 may be switched to the "on" state based on a voltage of a node 178 to radiate light. The voltage of the node 178 may be, for example, the rectified voltage $V_{rec}$ at the output end of the second rectifier circuit 140. Alternatively, a voltage from an external power source other than the rectified voltage $V_{rec}$ at the output end of the second rectifier circuit 140 may be applied to the LED 171. The photodiode 173 may be switched to the "on" state when the light radiated from the LED 171 arrives. As the photodiode 173 is switched to the on state, a connection path may be formed between the resistor 174 and the sources of the first switch 121 and the second switch 122. As a current flows along the connection path between the resistor 174 and the sources of the first switch 121 and the second switch 122, charge of the capacitor 133 may be discharged. Thus, when the both-end voltage of the capacitor 104, which is equal to the voltage between the gates and the sources of the first switch 121 and the second switch 122, gradually decreases to below threshold voltages of the first switch 121 and the second switch 122, the first switch 121 and the second switch 122 may be switched to the "off" state.

The controller 180 may control the voltage $V_{con}$ applied to the switch 176 to be substantially 0, when determining that the rectified voltage $V_{rec}$ at the output end of the second rectifier circuit 140 is less than the threshold. When the magnitude of the voltage $V_{con}$ applied from the controller 180 to the switch 176 does not exceed the threshold voltage of the switch 176, the switch 176 may be switched to the off state, such that the LED 171 may be switched to the "off" state and light may not be radiated from the LED 171. The photodiode 173 may be switched to the "off" state when the light radiated from the LED 171 does not arrive. As the photodiode 173 is switched to the "off" state, the connection between the resistor 174 and the sources of the first switch 121 and the second switch 122 may be cut off, and the capacitor 104 may be charged by energy stored in the capacitor 133. When the both-end voltage of the capacitor 104 increases above the threshold voltages of the first switch 121 and the second switch 122, the first switch 121 and the second switch 122 may be switched to the on state.

When the magnitude of the voltage $V_{con}$ applied from the controller 180 to the switch 176 of the switching circuit 170 exceeds the threshold voltage of the switch 176, the both-end voltage of the capacitor 104 may decrease below the threshold voltages of the first switch 121 and the second switch 122, such that the first switch 121 and the second switch 122 may be switched to the "off" state. On the other hand, when the magnitude of the voltage $V_{con}$ applied from the controller 180 to the switch 176 of the switching circuit 170 is less than the threshold voltage of the switch 176, the both-end voltage of the capacitor 104 may increase above the threshold voltages of the first switch 121 and the second switch 122, such that the first switch 121 and the second switch 122 may be switched to the "on" state. That is, the switching circuit 170 may output a control signal for controlling the bidirectional switch 120 including the first switch 121 and the second switch 122 in the form of the both-end voltage of the capacitor 104, according to the voltage $V_{con}$ applied to the switch 176 from the controller 180.

FIG. 2A is a diagram illustrating an equivalent circuit of the wireless power receiver when the magnitude of the voltage $V_{con}$ applied from the controller exceeds the threshold voltage of the switch. FIG. 2B is a diagram illustrating an equivalent circuit of the wireless power receiver when the magnitude of the voltage $V_{con}$ applied from the controller is less than the threshold voltage of the switch. In equivalent circuit diagrams of FIGS. 2A and 2B, a receiving circuit 210 may include the second rectifier circuit 140, the capacitor 151, the LDO regulator 152, the charger 153, and the battery 154 of FIG. 1.

Referring to FIG. 2A, as described with reference to FIG. 1, when the magnitude of the voltage $V_{con}$ applied from the controller 180 to the switch 176 of the switching circuit 170 exceeds the threshold voltage of the switch 176, the bidirectional switch 120 including the first switch 121 and the second switch 122 may be switched to the "off" state such that a current may not flow through both ends of the bidirectional switch 120. In this case, the receiving circuit 210 may be serially connected to the first coil 111, the first capacitor 112, and the second coil 113 to form a serial resonance circuit, and the receiving circuit 210, the first coil 111, the first capacitor 112, and the second coil 113 may form one closed loop 200a. In addition, based on a magnetic field generated from a power transmitter, a current may be induced in a circuit including the first coil 111, the first capacitor 112, and the second coil 113 of the resonance circuit 110, such that the resonance circuit 110 may receive wireless power.

Referring to FIG. 2B, as described with reference to FIG. 1, when the magnitude of the voltage $V_{con}$ applied from the controller 180 to the switch 176 of the switching circuit 170 is less the threshold voltage of the switch 176, the bidirectional switch 120 including the first switch 121 and the second switch 122 may be switched to the "on" state such that a current may flow through both ends of the bidirectional switch 120. In this case, the receiving circuit 210 may be connected in parallel to a first circuit, which is formed by serially connecting the first coil 111 and the first capacitor 112, and the second coil 113 to form a parallel resonance circuit. The first coil 111 and the first capacitor 112 may form one closed loop 201b, and the receiving circuit 210 and the second coil 113 may form one closed loop 202b. In addition, a current may be induced in the first circuit including the first coil 111 and the first capacitor 112 of the resonance circuit 110 based on a magnetic field generated from a power transmitter, and a current may be induced to a second circuit including the second coil 113 based on a magnetic field generated in the first circuit, such that the resonance circuit 110 may receive wireless power.

The wireless power receiver 100, described with reference to FIGS. 1, 2A, and 2B, requires the gate driver circuit 160 for controlling the gate voltages of the first switch 121 and the second switch 122, which limits downsizing of the wireless power receiver 100. Moreover, as the gate driver circuit 160 includes many elements, the wireless power receiver 100 is also limited in any reduction in production cost.

SUMMARY

In accordance with an aspect of the disclosure, a wireless power receiving device may include a bidirectional switch, a source of which may be connected to the ground.

In accordance with an aspect of the disclosure, a wireless power receiver is provided that receives wireless power from a wireless power transmitter. The wireless power receiver includes a resonance circuit configured to receive the wireless power, and including a first coil, a second coil, and a first capacitor. The wireless power receiver also includes a rectifier circuit connected to the resonance circuit, and including a first rectifier circuit and a second rectifier circuit forming a full bridge structure. The wireless power receiver also includes a driver circuit. The first rectifier circuit includes a first MOSFET, a second MOSFET, a third MOSFET, and a fourth MOSFET. Sources of the first MOSFET and the second MOSFET are connected to both ends of a resonator in which the first coil and the first capacitor are connected in series. Sources of the third MOSFET and the fourth MOSFET are connected to ground. The driver circuit is connected to gates of the first MOSFET, the second MOSFET, the third MOSFET and the fourth MOSFET. When the driver circuit switches off the first MOSFET and the second MOSFET and switches on the third MOSFET and the fourth MOSFET, as a first current is induced in the resonator based on a first magnetic field generated from the wireless power transmitter and a second current is induced in the second coil based on a second magnetic field generated in the resonator, the resonance circuit receives the wireless power, and the second current induced in the second coil is rectified by the second rectifier circuit.

In accordance with an aspect of the disclosure, a wireless power receiver is provided that receives wireless power from a wireless power transmitter. The wireless power receiver includes a resonance circuit configured to receive the wireless power, and includes a first coil, a second coil, a first capacitor, and bidirectional switch. The wireless power receiver also includes a rectifier circuit connected to the resonance circuit, and a driver circuit. The bidirectional switch includes a first MOSFET and a second MOSFET. Sources of the first MOSFET and the second MOSFET are connected to ground. The driver circuit is connected to gates of the first MOSFET and the second MOSFET. When the driver circuit switches off the first MOSFET and the second MOSFET, as a first current is induced in a first circuit including the first coil, the second coil, and the first capacitor based on a first magnetic field generated from the wireless power transmitter, the resonance circuit is configured to receive the wireless power. When the driver circuit switches on the first MOSFET and the second MOSFET, as a second current is induced in a second circuit including the first coil and the first capacitor based on the first magnetic field generated from the wireless power transmitter and a third current is induced in a third circuit including the second coil based on a second magnetic field generated in the second circuit, the resonance circuit is configured to receive the wireless power.

According to embodiments of the disclosure, a wireless power receiver is provided that receives wireless power from a wireless power transmitter. The wireless power receiver includes a bidirectional switch, a source of which may be connected to the ground. The wireless power receiver may not need the complex gate driver circuit 160 of FIG. 1, and thus, may be produced at a low unit cost with a small size.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
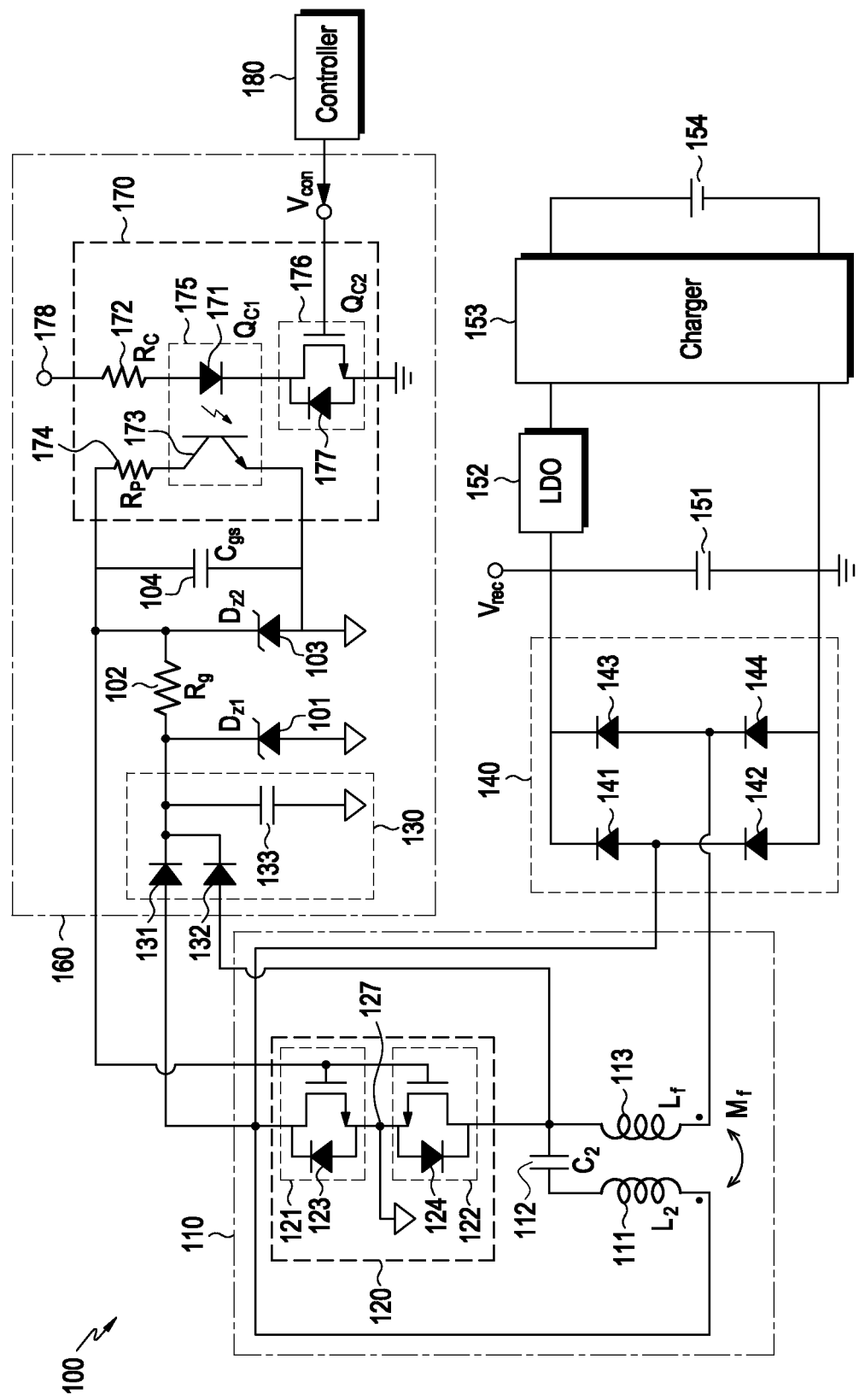
FIG. 1 is a circuit diagram illustrating a wireless power receiver that performs wireless charging.
Figure 2A:
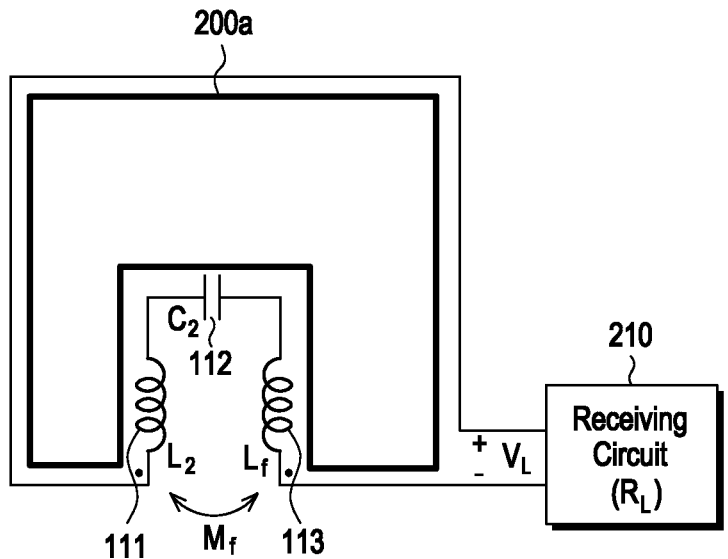
FIGS. 2A and 2B are diagrams illustrating circuits of a wireless power receiver.
Figure 2B:
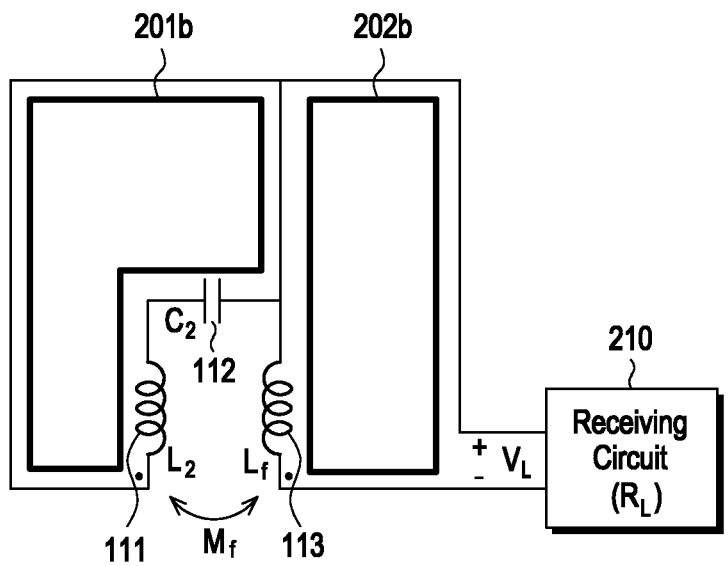

The disclosure may have various embodiments, and various modifications and changes may be made to the embodiments of the disclosure. Hereinafter, some of the embodiments will be described in detail with reference to the accompanying drawings. However, this is not intended to limit the disclosure to particular embodiments, and it should be appreciated that the disclosure includes all changes, equivalents, or alternatives falling within the technical idea and scope of the disclosure.

With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. The terms including an ordinal number, such as expressions "a first" and "a second" may be used to describe various elements, but the corresponding elements should not be limited by such terms. These terms are used merely to distinguish between one element and any other element. For example, a first element may be termed a second element, and similarly, a second element may be termed a first element without departing from the scope of the disclosure. The term "and/or" includes any combination of a plurality of relevant items or nay one of the plurality of relevant items. When an element (e.g., first element) is referred to, with or without the term "operatively" or "communicatively", as "coupled with," "coupled to," "connected with," or "connected to" another element (e.g., second element), it means that the element may be coupled or connected to or with the other element directly (e.g., wiredly), wirelessly, or via a third element.

Further, relative terms described as viewed from the drawings, such as "front surface", "rear surface", "top surface", and "bottom surface", may be replaced by ordinal numbers such as "first" and "second". In the ordinal numbers such as "first" and "second", the order of them is determined in the mentioned order or arbitrarily and may be arbitrarily changed as necessary.

The terms used in the disclosure are only used to describe specific embodiments, and are not intended to limit the disclosure. A singular expression may include a plural expression unless they are definitely different in a context. In the disclosure, it should be appreciated that the expression "include" or "have" is intended to refer to the existence of a corresponding feature, numeral, step, operation, constituent element, component, or a combination thereof, and does not exclude the existence or addition of one or more other features, numerals, steps, operations, constituent elements, components, or a combination thereof.

Unless defined otherwise, all terms used herein, including technical and scientific terms, have the same meaning as those commonly understood by a person skilled in the art to which the disclosure pertains. Such terms as those defined in a generally used dictionary should be interpreted to have the meanings equal to the contextual meanings in the relevant field of art, and are not to be interpreted to have ideal or excessively formal meanings unless clearly defined in the disclosure.

In the disclosure, the electronic device may be any device including a touch panel, and the electronic device may be referred to as a terminal, a portable terminal, a mobile terminal, a communication terminal, a portable communication terminal, a portable mobile terminal, or a display device.

For example, the electronic device may include a smartphone, a mobile phone, a navigation device, a game console, a TV, an in-vehicle head unit, a notebook computer, a laptop computer, a tablet computer, a personal media player (PMP), or a personal digital assistant (PDA). The electronic device may be implemented as a pocket-sized portable communication terminal having a wireless communication function. In addition, the electronic device may be a flexible device or a flexible display device.

The electronic device may communicate with an external electronic device, such as a server, or may perform a task through interworking with an external electronic device. For example, the electronic device may transmit an image captured using a camera and/or location information detected by a sensor unit to a server through a network. The network may be, but is not limited to, a mobile or cellular network, a local area network (LAN), a wireless local area network (WLAN), a wide area network (WAN), the Internet, or a small area network (SAN).

According to embodiments of the disclosure, a wireless power receiver is provided that receives wireless power from a wireless power transmitter. The wireless power receiver includes a bidirectional switch, a source of which may be connected to the ground. The wireless power receiver may not need the complex gate driver circuit 160 of FIG. 1, and thus, may be produced at a low unit cost with a small size.

Figure 3:
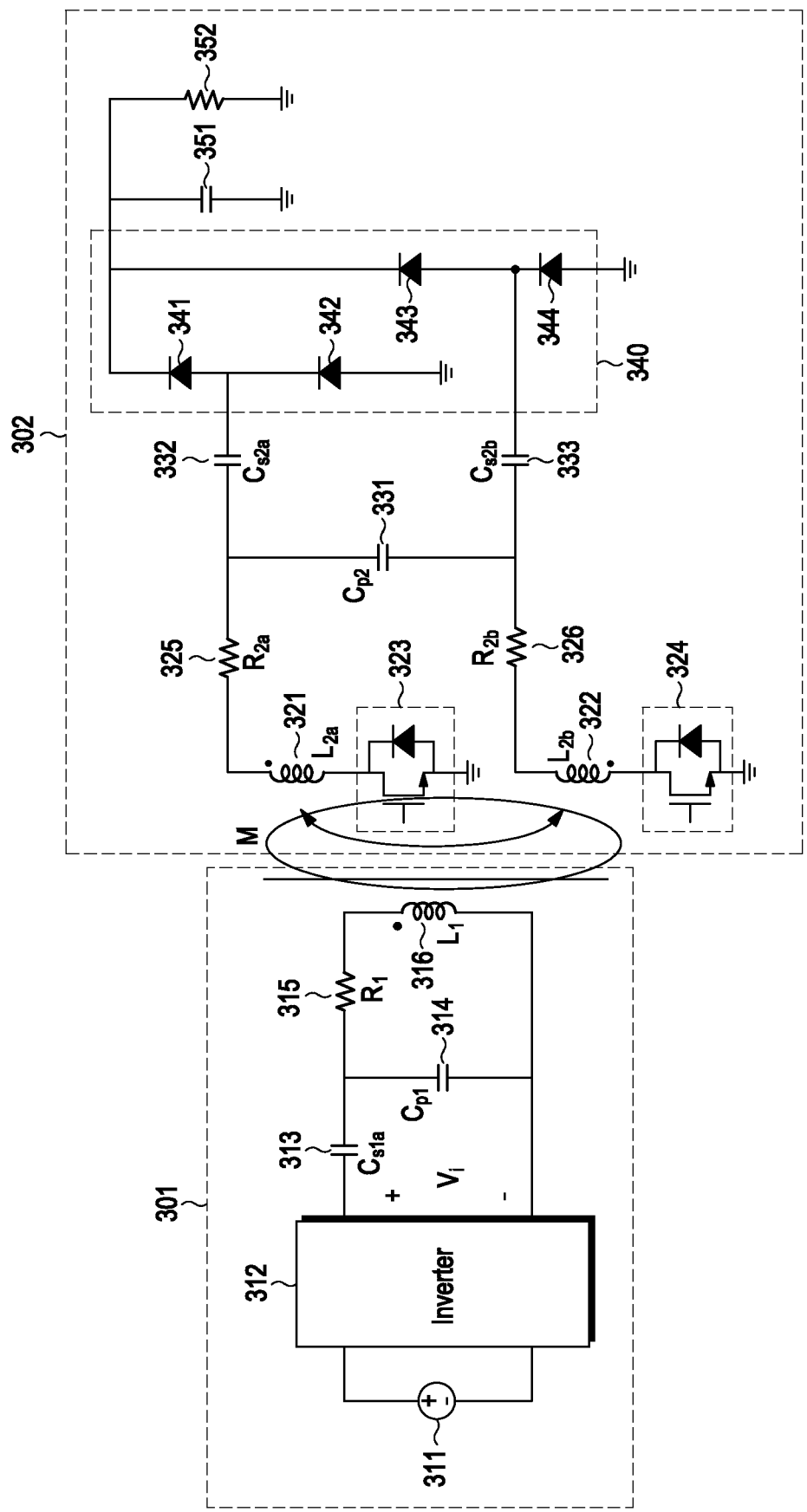
FIG. 3 is a circuit diagram illustrating a wireless power transmitter and a wireless power receiver, according to an embodiment.

FIG. 3 is a circuit diagram illustrating a wireless power transmitter and a wireless power receiver, according to an embodiment of the disclosure.

Referring to FIG. 3, a wireless power transmitter 301 may include a power source 311, an inverter 312, and a resonance circuit. The resonance circuit of the wireless power transmitter 301 may include a first capacitor 313, a second capacitor 314, a resistor 315, and a transmitting coil 316. The power source 311 may output direct current (DC) power, and the inverter 312 may convert the DC power output from the power source 311 into alternating current (AC) power. Characteristic values of the first capacitor 313, the second capacitor 314, the resistor 315, and the transmitting coil 316 constituting the resonance circuit may be set in consideration of a resonance frequency and/or impedance matching. At least one of the first capacitor 313, the second capacitor 314, the resistor 315, and the transmitting coil 316 constituting the resonance circuit may be implemented as a variable element having a characteristic value that may be changed. As shown in FIG. 3, it may be understood by those of ordinary skill in the art that the connection between the first capacitor 313, the second capacitor 314, the resistor 315, and the transmitting coil 316 is merely exemplary.

Referring to FIG. 3, according to various embodiments, the wireless power receiver 302 may include a resonance circuit, a rectifier circuit 340, a capacitor 351, and a load 352. The resonance circuit may include a first receiving coil 321, a second receiving coil 322, a first switch 323, a second switch 324, a first resistor 325, a second resistor 326, a first capacitor 331, a second capacitor 332, and a third capacitor 333. The first switch 323 and the second switch 324 may be implemented as MOSFETs.

According to various embodiments, sources of the first switch 323 and the second switch 324 may be connected to the ground. Thus, the wireless power receiver 302 may not need an isolated gate driver circuit (e.g., the gate driver circuit 160 of FIG. 1) to drive the first switch 323 and the second switch 324.

According to various embodiments, the first receiving coil 321 and the second receiving coil 322 of the resonance circuit may be magnetically coupled to the transmitting coil 316 of the wireless power transmitter 301. When the first switch 323 and the second switch 324 are switched to the "on" state, an induced current based on a magnetic field induced in the transmitting coil 316 may flow through the first receiving coil 321 and the second receiving coil 322 of the resonance circuit, which may be referred to as the resonance circuit receiving the wireless power from the wireless power transmitter 301. The wireless power received in the resonance circuit may be rectified into DC by the rectifier circuit 340. The rectifier circuit 340 may include four diodes 341, 342, 343, and 344 forming a full bridge structure. The rectifier circuit 340 may instead include four MOSFETs forming a full bridge structure. The rectifier circuit 340 may also instead include two FETs or two diodes forming a half bridge structure.

According to various embodiments, based on the wireless power rectified in the form of DC by the rectifier circuit 340, the capacitor 351 may be charged and power may be supplied to the load 352. The load 352 may include a DC/DC converter, an LDO regulator, a charger, a battery, and a driver circuit that generates a driving signal for switching the first switch 323 and the second switch 324.

According to various embodiments, when the first switch 323 and the second switch 324 are switched to the "off" state, a current may not flow through the first receiving coil 321 and the second receiving coil 322 of the resonance circuit. At this time, power may be supplied to the load 352 based on charges charged in the capacitor 351.

According to various embodiments, a control circuit may operate to prevent an excessively high voltage from being applied to the wireless power receiver 302. For example, the control circuit may switch the first switch 323 and the second switch 324 to the "off" state when a voltage applied to an output end of the rectifier circuit 340 is higher than a threshold. The control circuit may switch the first switch 323 and the second switch 324 to the "on" state when the voltage applied to the output end of the rectifier circuit 340 is less than or equal to the threshold.

Figure 4:
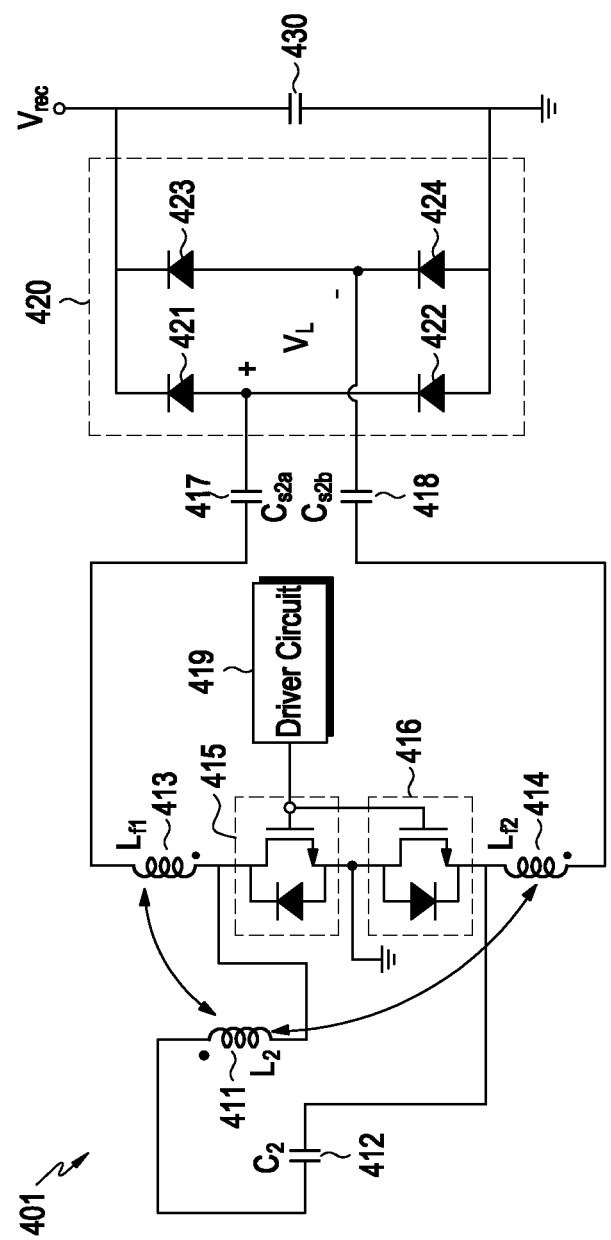
FIG. 4 is a circuit diagram illustrating a wireless power receiver, according to an embodiment.
Figure 5A:
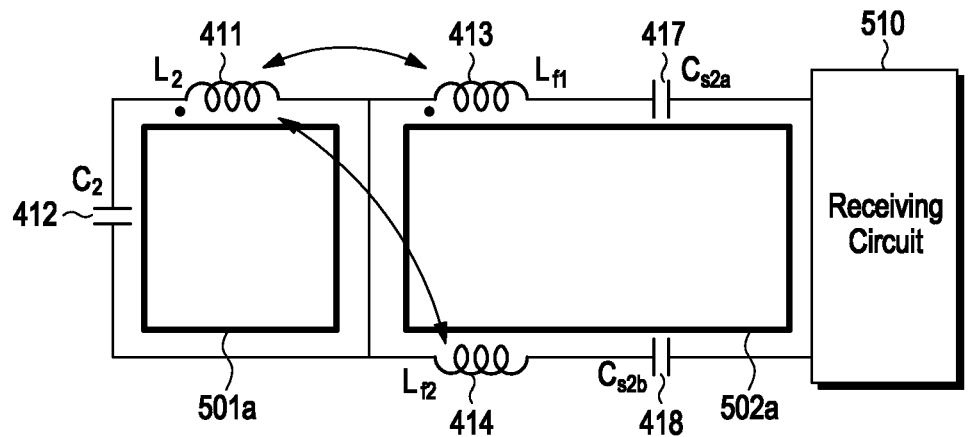
FIGS. 5A and 5B is a diagram illustrating equivalent circuits of a wireless power receiver, according to an embodiment.
Figure 5B:
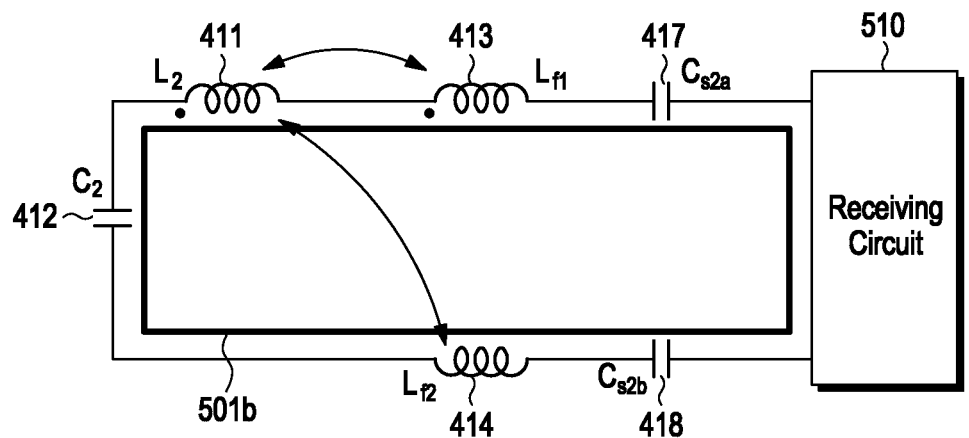

FIG. 4 is a circuit diagram illustrating a wireless power receiver, according to an embodiment of the disclosure. FIGS. 5A and 5B are diagrams illustrating equivalent circuits of a wireless power receiver, according to an embodiment of the disclosure.

Referring to FIG. 4, a wireless power receiver 401 may include a resonance circuit, a rectifier circuit 420, a driver circuit 419, and a capacitor 430. The wireless power receiver 401 may further include a load that includes a DC/DC converter, an LDO regulator, a charger, and a battery.

According to various embodiments, the resonance circuit may include a first coil 411, a first capacitor 412, a second coil 413, a third coil 414, a second capacitor 417, and a third capacitor 418, and a bidirectional switch. According to various embodiments, the bidirectional switch may be implemented with a first MOSFET 415 and a second MOSFET 416. The second coil 413 and the third coil 414 may be wound such that a dot direction is indicated opposite to a direction shown in FIG. 4.

According to various embodiments, sources of the first MOSFET 415 and the second MOSFET 416 may be connected to the ground. Thus, the wireless power receiver 401 may not need an isolated gate driver circuit (e.g., the gate driver circuit 160 of FIG. 1) to drive the first MOSFET 415 and the second MOSFET 416.

According to various embodiments, the driver circuit 419 may provide a driving signal for controlling the first MOSFET 415 and the second MOSFET 416 to the first MOSFET 415 and the second MOSFET 416. When the magnitude of the driving signal is sufficiently large such that gate voltages of the first MOSFET 415 and the second MOSFET 416 exceed threshold voltages of the first MOSFET 415 and the second MOSFET 416, the first MOSFET 415 and the second MOSFET 416 may be in the "on" state. In this case, it may be expressed that the driver circuit 419 switches the first MOSFET 415 and the second MOSFET 416 to be in the "on" state. When the magnitude of the driving signal is not sufficiently large such that the gate voltages of the first MOSFET 415 and the second MOSFET 416 are less than or equal to the threshold voltages of the first MOSFET 415 and the second MOSFET 416, the first MOSFET 415 and the second MOSFET 416 may be in the "off" state. In this case, it may be expressed that the driver circuit 419 switches the first MOSFET 415 and the second MOSFET 416 to be in the "off" state.

FIG. 5A is a diagram illustrating an equivalent circuit of the wireless power receiver 401 when the driver circuit 419 switches the first MOSFET 415 and the second MOSFET 416 to be in the "on" state. In FIG. 5A, a receiving circuit 510 may refer to components other than a resonance circuit among the components of the wireless power receiver 401. When the driver circuit 419 switches the first MOSFET 415 and the second MOSFET 416 to be in the "on" state, the wireless power receiver 401 may include a first circuit 501a forming a closed loop and a second circuit 502a forming a closed loop. Based on a magnetic field generated from a wireless power transmitter, a current may be induced in the first circuit 501a including the first coil 411 and the first capacitor 412. Based on a magnetic field generated in the first coil 411, a current may be induced in the second circuit 502a including the second coil 413, the third coil 414, the second capacitor 417, and the third capacitor 418. Voltages induced in the second coil 413 and the third coil 414 may be a voltage induced in the first coil 411 that is increased by the goodness Q of the resonance circuit. As a result, the voltage applied to the receiving circuit 510 in FIG. 5A may be higher than the voltage in FIG. 5B.

FIG. 5B is a diagram illustrating an equivalent circuit of the wireless power receiver 401 when the driver circuit 419 switches the first MOSFET 415 and the second MOSFET 416 to be in the "off" state. In FIG. 5B, the receiving circuit 510 may refer to components other than a resonance circuit among the components of the wireless power receiver 401. Referring to FIG. 5B, when the driver circuit 419 switches the first MOSFET 415 and the second MOSFET 416 to be in the "off" state, the wireless power receiver 401 is equivalent to a third circuit 501b forming one large, closed loop. Based on a magnetic field generated from the wireless power transmitter, a current may be induced in the third circuit

501b including the first coil 411, the first capacitor 412, the second coil 413, the third coil 414, the second capacitor 417, and the third capacitor 418.

As described above, as the driver circuit 419 switches between on/off in the first MOSFET 415 and the second MOSFET 416, the voltage applied to the receiving circuit 510 may be different. The driver circuit 419 may control on/off of the first MOSFET 415 and the second MOSFET 416, based on the voltage applied to the receiving circuit 510. For example, the driver circuit 419 may switch the first MOSFET 415 and the second MOSFET 416 to the "off" state when the voltage $V_{rec}$ at the output end of the rectifier circuit 420 is greater than or equal to a threshold, and may switch the first MOSFET 415 and the second MOSFET 416 to the "on" state when the voltage $V_{rec}$ at the output end of the rectifier circuit 420 is less than the threshold.

Referring back to FIG. 4, the rectifier circuit 420 may include four diodes 421, 422, 423, and 424 forming a full bridge structure. According to various embodiments, unlike in FIG. 4, the rectifier circuit 420 may include four MOSFETs forming a full bridge structure. When the rectifier circuit 420 includes four MOSFETs, the on/off state of each of the four MOSFETs may be synchronously switched according to the voltage applied to each of the four MOSFETs.

According to various embodiments, unlike in FIG. 4, the rectifier circuit 420 may include two FETs or two diodes forming a half bridge structure.

Figure 6:
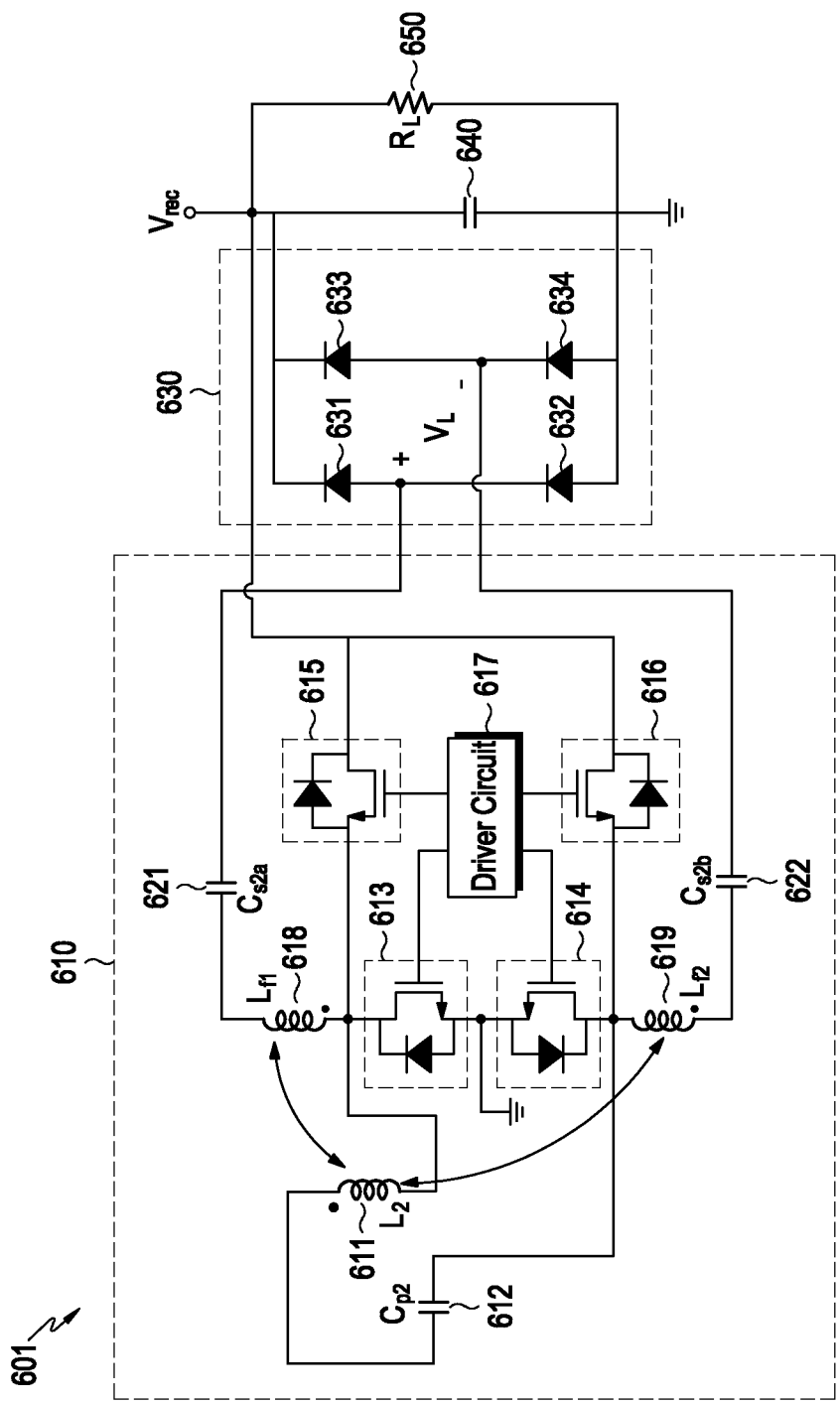
FIG. 6 is a circuit diagram illustrating a wireless power receiver, according to an embodiment.
Figure 7A:
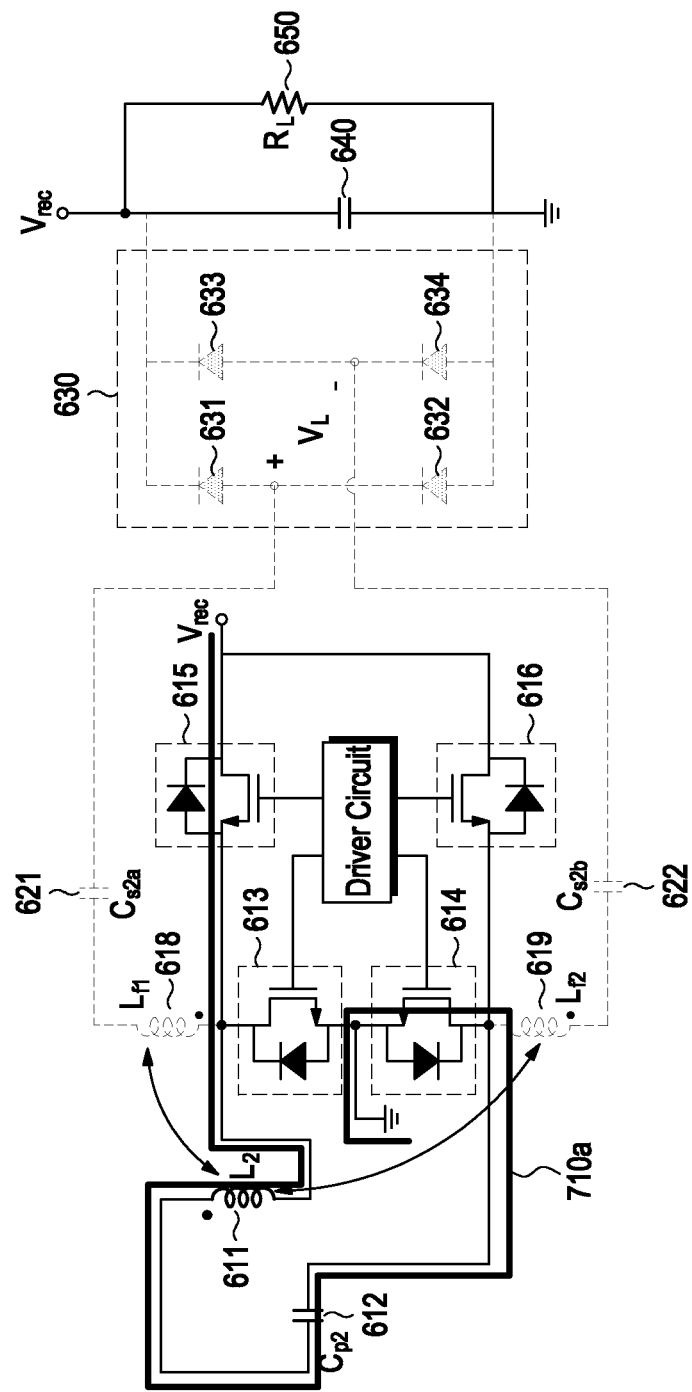
FIGS. 7A and 7B is a diagram illustrating equivalent circuits of a wireless power receiver, according to an embodiment.
Figure 7B:
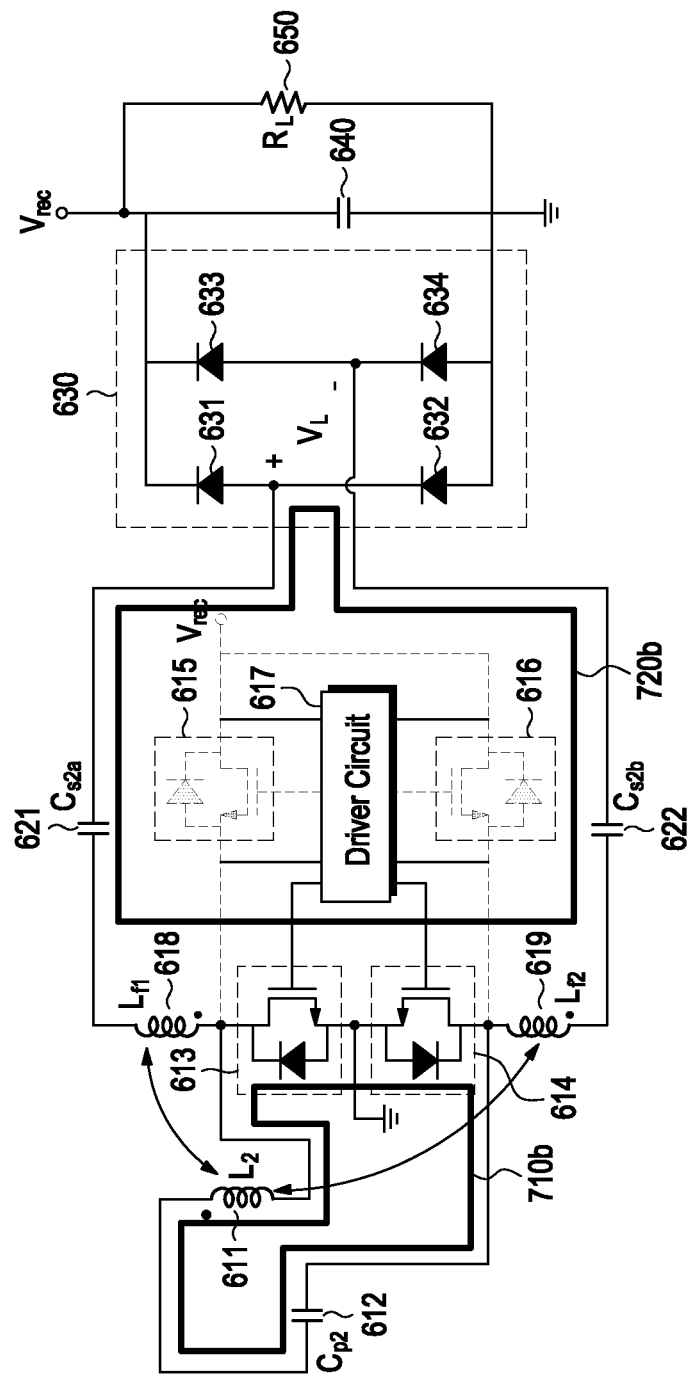

FIG. 6 is a circuit diagram illustrating a wireless power receiver, according to an embodiment of the disclosure. FIGS. 7A and 7B are diagrams illustrating equivalent circuits of a wireless power receiver, according to an embodiment of the disclosure.

Referring to FIG. 6, a wireless power receiver 601 may include a resonance circuit 610, a rectifier circuit 630, a capacitor 640, and a load 650.

According to various embodiments, the resonance circuit may include a first coil 611, a first capacitor 612, a second coil 618, a third coil 619, a second capacitor 621, a third capacitor 622, a first MOSFET 615, a second MOSFET 616, a third MOSFET 613, a fourth MOSFET 614, and a driver circuit 617. The second coil 618 and the third coil 619 may be wound such that a dot direction is indicated opposite to a direction shown in FIG. 6.

According to various embodiments, unlike in FIG. 6, the first MOSFET 615 and the second MOSFET 616 may be replaced with a first diode and a second diode.

According to various embodiments, the first MOSFET 615, the second MOSFET 616, the third MOSFET 613, the fourth MOSFET 614 may form a full bridge structure. Drains of the first MOSFET 615 and the second MOSFET 616 may be connected to an output end of the rectifier circuit 630. Sources of the first MOSFET 613 and the second MOSFET 614 may be connected to the ground. Thus, the wireless power receiver 601 may not need an isolated gate driver circuit (e.g., the gate driver circuit 160 of in FIG. 1) to drive the third MOSFET 613 and the fourth MOSFET 614. The driver circuit 617 may provide a driving signal for synchronously switching the first MOSFET 615, the second MOSFET 616, the third MOSFET 613, and the fourth MOSFET 614 to the first MOSFET 615, the second MOSFET 616, the third MOSFET 613, and the fourth MOSFET 614, respectively. The driver circuit 617 may provide a driving signal for switching the first MOSFET 615, the second MOSFET 616, the third MOSFET 613, and the fourth MOSFET 614 to the "off" state to the first MOSFET 615, the second MOSFET 616, the third MOSFET 613, and the fourth MOSFET 614, respectively.

FIG. 7A is a diagram illustrating an equivalent circuit of the wireless power receiver 601 when the driver circuit 617 synchronously switches the first MOSFET 615, the second MOSFET 616, the third MOSFET 613, and the fourth MOSFET 614 or the driver circuit 617 switches the first MOSFET 615, the second MOSFET 616, the third MOSFET 613, and the fourth MOSFET 614 to the "off" state. In FIG. 7A, a component through which a relatively small current flows is indicated by a dotted line.

Referring to FIG. 7A, when the driver circuit 617 synchronously switches the first MOSFET 615, the second MOSFET 616, the third MOSFET 613, and the fourth MOSFET 614, a current may be induced in a first circuit 710a including the first coil 611 and the first capacitor 612, based on the magnetic field generated from the wireless power transmitter. The current induced in the first circuit 710a is AC, such that according to the sign of the induced current, the driver circuit may switch on the first MOSFET 615 and the fourth MOSFET 614 and may switch off the second MOSFET 616 and the third MOSFET 613, or may switch on the second MOSFET 616 and the third MOSFET 613 and may switch off the first MOSFET 615 and the fourth MOSFET 614. When the driver circuit 617 synchronously switches the first MOSFET 615, the second MOSFET 616, the third MOSFET 613, and the fourth MOSFET 614, a current smaller than the current flowing in the first circuit 710a may flow through the second coil 618, the third coil 619, the second capacitor 621, the third capacitor 622, and the rectifier circuit 630. The magnitude of the current flowing in the second coil 618 may be smaller as the magnitude of a mutual inductance between the first coil 611 and the second coil 618 decreases. As resonant frequencies of the second coil 618 and the second capacitor 621 are much lower than an operating frequency of the wireless power receiver 601, the magnitude of the current flowing in the second coil 618 may be smaller. The magnitude of the current flowing in the third coil 619 may be smaller as the magnitude of a mutual inductance between the first coil 611 and the third coil 619 decreases. As resonant frequencies of the third coil 619 and the third capacitor 622 are much lower than the operating frequency of the wireless power receiver 601, the magnitude of the current flowing in the third coil 619 may be smaller.

Referring to FIG. 7A, the first MOSFET 615, the second MOSFET 616, the third MOSFET 613, and the fourth MOSFET 614 may form the full bridge structure and drains of the first MOSFET 615 and the second MOSFET 616 may be connected to the output end of the rectifier circuit 630, such that power induced in the first circuit 710a may be rectified by the first MOSFET 615, the second MOSFET 616, the third MOSFET 613, and the fourth MOSFET 614. The rectified power may be supplied to the output end of the rectifier circuit 630 and supplied to the capacitor 640 and the load 650.

According to various embodiments, when the driver circuit 617 switches the first MOSFET 615, the second MOSFET 616, the third MOSFET 613, and the fourth MOSFET 614 to the "off" state, power induced in the first circuit 710a may be rectified by body diodes of the first MOSFET 615, the second MOSFET 616, the third MOSFET 613, and the fourth MOSFET 614. The rectified power may be supplied to the output end of the rectifier circuit 630 and supplied to the capacitor 640 and the load 650.

According to various embodiments, the driver circuit 617 may switch the third MOSFET 613 and the fourth MOSFET 614 to the "on" state and switch the first MOSFET 615 and the second MOSFET 616 to the "off" state. FIG. 7B is a diagram illustrating an equivalent circuit of the wireless power receiver 601 when the driver circuit 617 switches the third MOSFET 613 and the fourth MOSFET 614 to the "on" state and switches the first MOSFET 615 and the second MOSFET 616 to the "off" state. In FIG. 7B, a component through which a current does not flow is indicated by a dotted line.

Referring to FIG. 7B, as a current flows through the third MOSFET 613 and the fourth MOSFET 614 switched to the "on" state, the resonance circuit may include a second circuit 710b, forming a closed loop of the first coil 611, the first capacitor 612, the third MOSFET 613, and the fourth MOSFET 614, and a third circuit 720b, including the third MOSFET 613, the fourth MOSFET 614, the second coil 618, the third coil 619, the second capacitor 621, and the third capacitor 622. That is, a current may be induced in the second circuit 710b based on the magnetic field generated from the wireless power transmitter and a current may be induced in the third circuit 720b based on the magnetic field generated by the first coil 611, such that the resonance circuit may receive wireless power from the wireless power transmitter. The received wireless power may be rectified by the rectifier circuit 630, and the rectified wireless power may be supplied to the capacitor 640 and the load 650.

As described above, as the driver circuit 617 switches between on/off for each of the first MOSFET 615, the second MOSFET 616, the third MOSFET 613, and the fourth MOSFET 614, an operation of the resonance circuit may change.

According to various embodiments, the driver circuit 617 may switch between on/off for each of the first MOSFET 613, the second MOSFET 616, the third MOSFET 613, and the fourth MOSFET 614, based on the voltage $V_{rec}$ at the output end of the rectifier circuit 630. For example, the driver circuit 617 may synchronously switch the first MOSFET 615, the second MOSFET 616, the third MOSFET 613, and the fourth MOSFET 614 when the voltage $V_{rec}$ at the output end of the rectifier circuit 630 is greater than or equal to a threshold. The driver circuit 617 may switch the third MOSFET 613 and the fourth MOSFET 614 to the "on" state and switch the first MOSFET 615 and the second MOSFET 616 to the "off" state, when the voltage $V_{rec}$ of the output end of the rectifier circuit 630 is less than the threshold.

Referring back to FIG. 6, the rectifier circuit 630 may include four diodes 631, 632, 633, and 634 forming the full bridge structure. According to various embodiments, unlike in FIG. 6, the rectifier circuit 630 may include two FETs or two diodes forming the half bridge structure.

According to various embodiments, unlike in FIG. 6, the rectifier circuit 630 may include four MOSFETs forming a full bridge structure. When the rectifier circuit 630 includes four MOSFETs, the on/off state of each of the four MOSFETs may be synchronously switched according to the voltage applied to each of the four MOSFETs. For example, four MOSFETs included in the rectifier circuit 630 may be switched by the driver circuit 617. When the voltage $V_{rec}$ at the output end of the rectifier circuit 630 is greater than or equal to the threshold, the driver circuit 617 may switch four MOSFETs included in the rectifier circuit 630 to the "off" state while synchronously switching the first MOSFET 615, the second MOSFET 616, the third MOSFET 613, and the fourth MOSFET 614. Alternatively, when the voltage $V_{rec}$ at the output end of the rectifier circuit 630 is less than the threshold, the driver circuit 617 may switch the third MOSFET 613 and the fourth MOSFET 614 to the "on" state, switch the first MOSFET 615 and the second MOSFET 616 to the "off" state, and synchronously switch the four MOSFETs included in the rectifier circuit 630.

According to various embodiments, the load 650 may refer to components other than the resonance circuit 610, the rectifier circuit 630, and the capacitor 640 among the components of the wireless power receiver 601. For example, the load 650 may include a DC/DC converter, an LDO regulator, a charger, and a battery.

Figure 8:
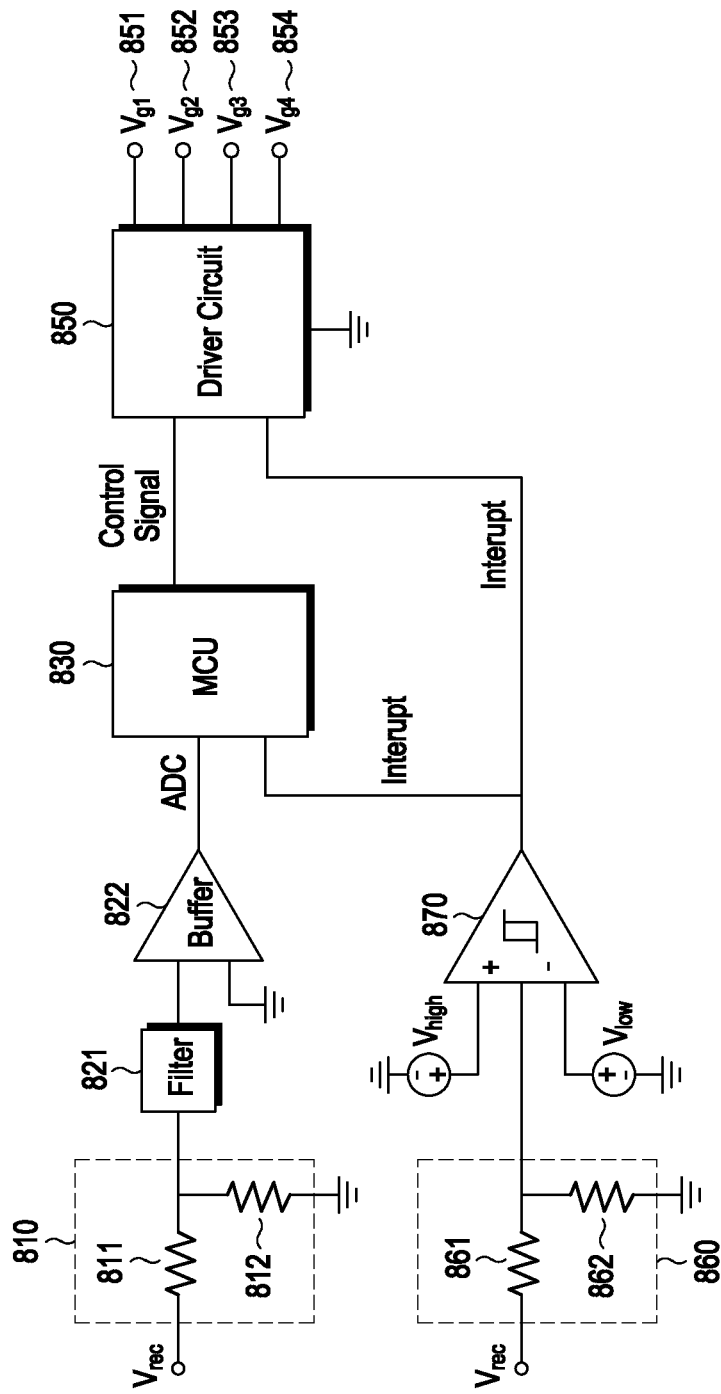
FIG. 8 is a diagram illustrating components for controlling a driver circuit of a wireless power receiver, according to an embodiment.

FIG. 8 is a diagram illustrating components for controlling a driver circuit of a wireless power receiver, according to an embodiment of the disclosure. A driver circuit 850 of a wireless power receiver (e.g., the wireless power receiver 601 of FIG. 6) may output driving signals 851, 852, 853, and 854 for controlling on/off of a plurality of switches (e.g., the first MOSFET 615, the second MOSFET 616, the third MOSFET 613, and the fourth MOSFET 614 of FIG. 6) based on a control signal from a micro controller unit (MCU) 830. The control signal may indicate whether to synchronously switch the first MOSFET 615, the second MOSFET 616, the third MOSFET 613, and the fourth MOSFET 614, whether to switch the first MOSFET 615, the second MOSFET 616, the third MOSFET 613, and the fourth MOSFET 614 to the "off" state, or whether to switch the third MOSFET 613 and the fourth MOSFET 614 to the "on" state and switch the first MOSFET 615 and the second MOSFET 616 to the "off" state.

According to various embodiments, the MCU 830 may provide a control signal to the driver circuit 850 on the basis of an analog signal based on the voltage $V_{rec}$ output from a rectifier circuit (e.g., the rectifier circuit 630 of FIG. 6). The analog signal input to the MCU 830 may be the output voltage $V_{rec}$ of the rectifier circuit passing through a voltage divider 810 including a first resistor 811 and a second resistor 812, a filter 821, and a buffer 822.

According to various embodiments, a hysteresis comparator 870 may provide an interrupt signal based on the output voltage $V_{rec}$ of the rectifier circuit (e.g., the rectifier circuit 630 of FIG. 6) to at least one of the MCU 830 or the driver circuit 850.

According to various embodiments, the MCU 830 may provide a control signal to the driver circuit 850 by using an interrupt signal in addition to the analog signal from the buffer 822.

According to various embodiments, the driver circuit 850 may be provided with the interrupt signal based on the output voltage $V_{rec}$ of the rectifier circuit (e.g., the rectifier circuit 630 of FIG. 6) from the hysteresis comparator 870, and output the driving signals 851, 852, 853, and 854 based on the interrupt signal and the control signal.

According to various embodiments, the interrupt signal may be a voltage output from the hysteresis comparator 870 when the output voltage $V_{rec}$ of the rectifier circuit having passed through the voltage divider 860 including the third resistor 861 and the fourth resistor 862 is input to the hysteresis comparator 870. The hysteresis comparator 870 may output a first interrupt signal when the input voltage is lower than $V_{high}$ and then higher than $V_{high}$, and output a second interrupt signal when the input voltage is higher than $V_{low}$ and then lower than $V_{low}$. $V_{high}$ may be set higher than $V_{low}$.

According to various embodiments, when the driver circuit 850 receives the first interrupt signal from the hysteresis comparator 870, regardless of a control signal from the MCU 830, the driver circuit 850 may synchronously switch the first MOSFET 615, the second MOSFET 616, the third MOSFET 613, and the fourth MOSFET 614, or switch the first MOSFET 615, the second MOSFET 616, the third MOSFET 613, and the fourth MOSFET 614 to the "off" state. When the driver circuit 850 receives the second interrupt signal from the hysteresis comparator 870, regardless of the control signal from the MCU 830, the driver circuit 850 may switch the third MOSFET 613 and the fourth MOSFET 614 to the "on" state and switch the first MOSFET 615 and the second MOSFET 616 to the "off" state.

FIG. 8 illustrates the voltage divider 810, the filter 821, the buffer 822, the voltage divider 860, and the hysteresis comparator 870, but the wireless power receiver (e.g., the wireless power receiver 601 of FIG. 6) may not include the voltage divider 810, the filter 821, and the buffer 822, or may not include the voltage divider 860 and the hysteresis comparator 870.

Although the above description has been mainly described with reference to the components of FIG. 6, the components driving the driver circuit 850 of FIG. 8 may be similarly included in the wireless power receiver 302 of FIG. 3, the wireless power receiver 401 of FIG. 4, a wireless power receiver 901 of FIG. 9, or a wireless power receiver 1101 of FIG. 11. For example, when the components of FIG. 8 are included in the wireless power receiver 401 of FIG. 4, the control signal may indicate whether to switch the first MOSFET 415 and the second MOSFET 416 to be in the "on" state or whether to switch the first MOSFET 415 and the second MOSFET 416 to be in the "off" state. In addition, the number of driving signals output from the driver circuit 850 may not be limited to 4.

Figure 9:
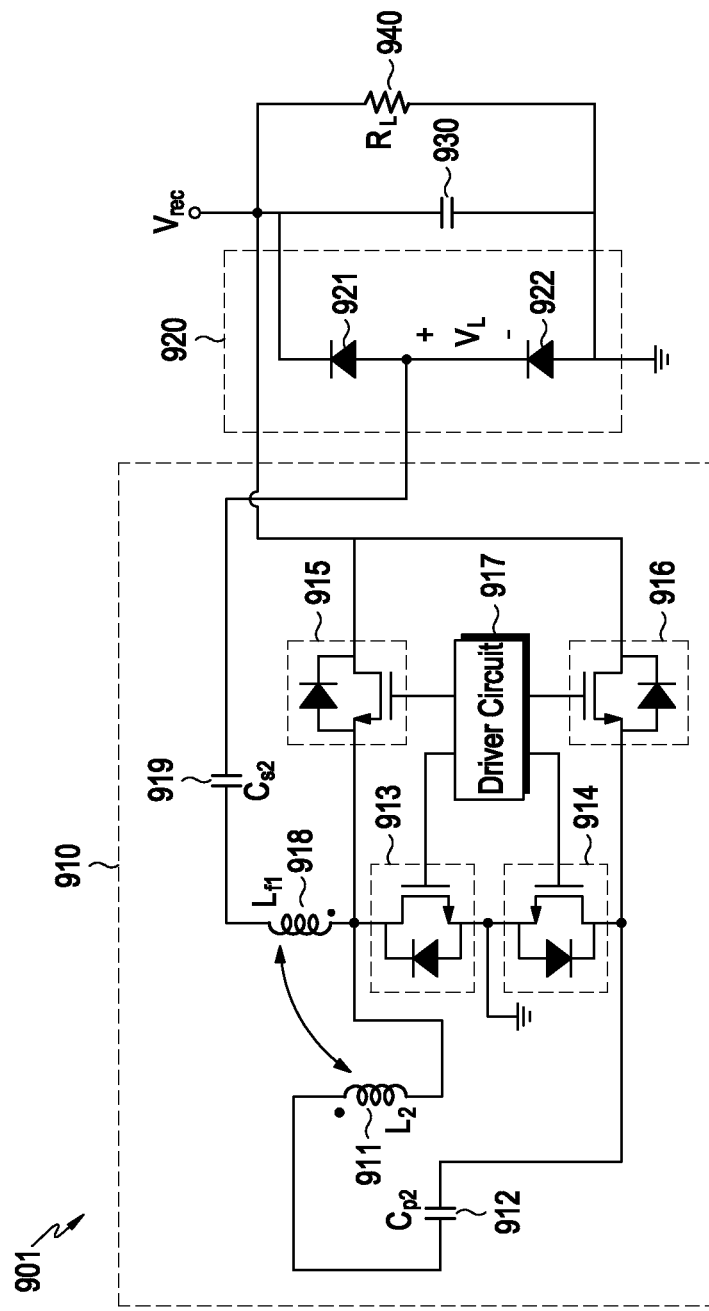
FIG. 9 is a circuit diagram illustrating a wireless power receiver, according to an embodiment.
Figure 10A:
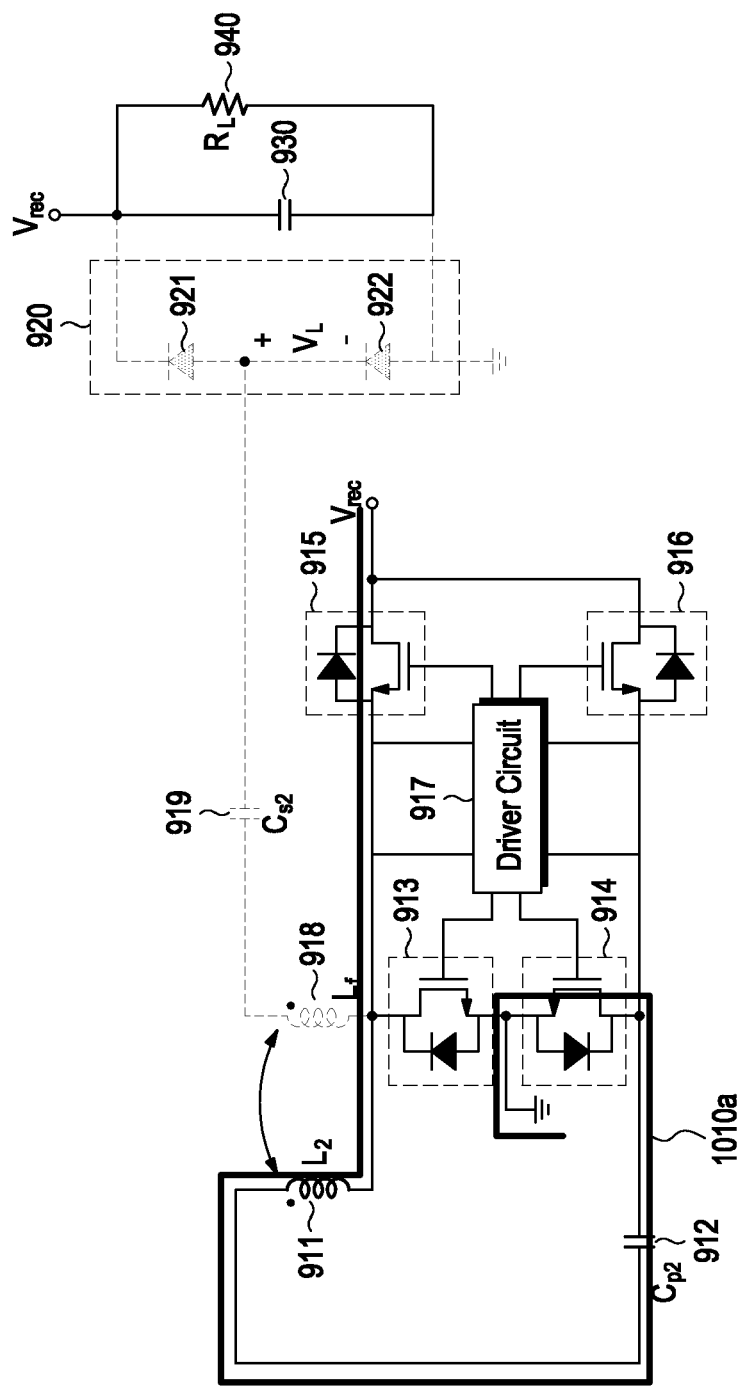
FIGS. 10A and 10B are diagrams illustrating equivalent circuits of a wireless power receiver, according to an embodiment.
Figure 10B:
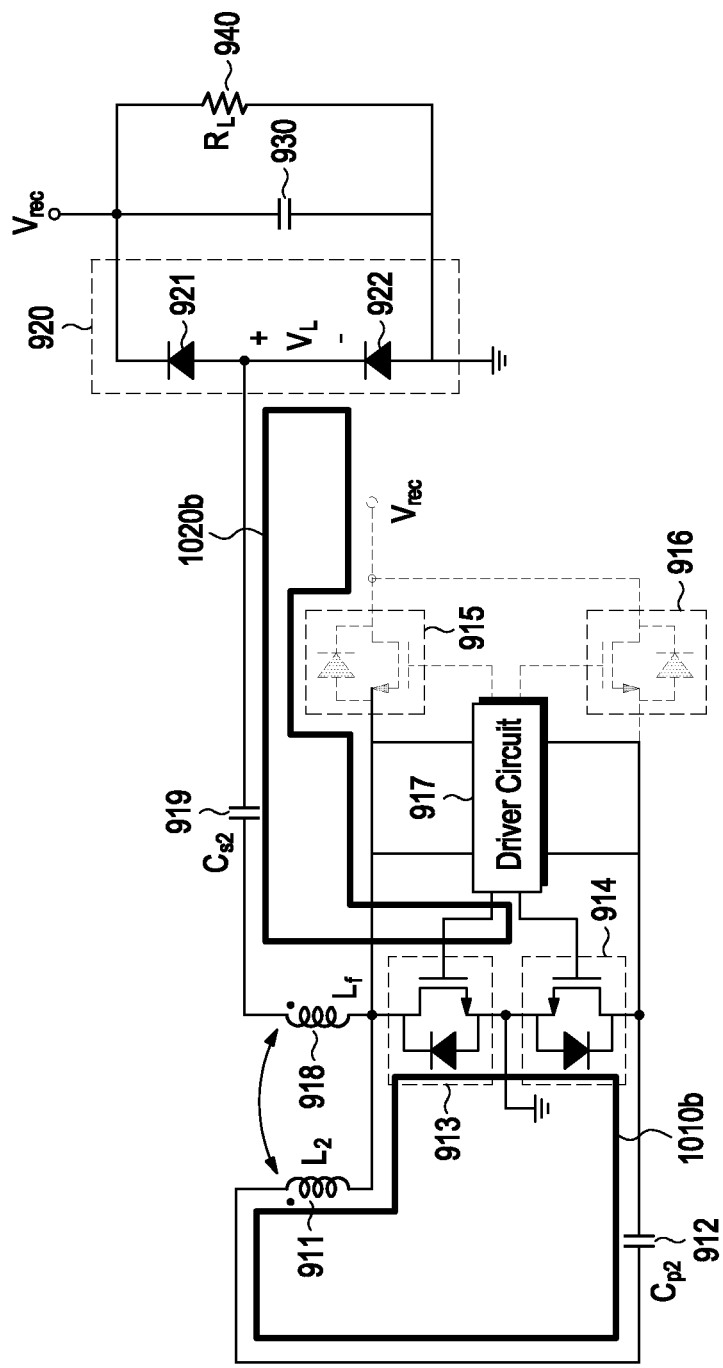

FIG. 9 is a circuit diagram illustrating a wireless power receiver, according to an embodiment of the disclosure. FIGS. 10A and 10B are diagrams illustrating equivalent circuits of the wireless power receiver shown in FIG. 9, according to an embodiment of the disclosure.

Referring to FIG. 9, a wireless power receiver 901 may include a resonance circuit 910, a rectifier circuit 920, a capacitor 930, and a load 940.

According to various embodiments, the resonance circuit may include a first coil 911, a first capacitor 912, a second coil 918, a second capacitor 919, a first MOSFET 915, a second MOSFET 916, a third MOSFET 913, a fourth MOSFET 914, and a driver circuit 917. The second coil 918 may be wound such that a dot direction is indicated opposite to a direction shown in FIG. 9.

According to various embodiments, the first MOSFET 915, the second MOSFET 916, the third MOSFET 913, the fourth MOSFET 914 may form the full bridge structure. Drains of the first MOSFET 915 and the second MOSFET 916 may be connected to an output end of the rectifier circuit 920. Sources of the first MOSFET 913 and the second MOSFET 914 may be connected to the ground. Thus, the wireless power receiver 901 may not need an isolated gate driver circuit (e.g., the gate driver circuit 160 of FIG. 1) to drive the third MOSFET 913 and the fourth MOSFET 914.

According to various embodiments, the driver circuit 917 may provide a driving signal for synchronously switching the first MOSFET 915, the second MOSFET 916, the third MOSFET 913, and the fourth MOSFET 914 to the first MOSFET 915, the second MOSFET 916, the third MOSFET 913, and the fourth MOSFET 914, respectively. The driver circuit 917 may provide a driving signal for switching the first MOSFET 915, the second MOSFET 916, the third MOSFET 913, and the fourth MOSFET 914 to the "off" state to the first MOSFET 915, the second MOSFET 916, the third MOSFET 913, and the fourth MOSFET 914, respectively. FIG. 10A shows an equivalent circuit of the wireless power receiver 901 when the driver circuit 917 synchronously switches the first MOSFET 915, the second MOSFET 916, the third MOSFET 913, and the fourth MOSFET 914, or switches the first MOSFET 915, the second MOSFET 916, the third MOSFET 913, and the fourth MOSFET 914 to the "off" state. In FIG. 10A, a component through which a relatively small current flows is indicated by a dotted line.

Referring to FIG. 10A, when the driver circuit 917 synchronously switches the first MOSFET 915, the second MOSFET 916, the third MOSFET 913, and the fourth MOSFET 914, a current may be induced in a first circuit 1010*a* including the first coil 911 and the first capacitor 912, based on the magnetic field generated from the wireless power transmitter. The current induced in the first circuit 1010*a* is AC, such that according to the sign of the induced current, the driver circuit may switch on the first MOSFET 915 and the fourth MOSFET 914 and switch off the second MOSFET 916 and the third MOSFET 913, or may switch on the second MOSFET 916 and the third MOSFET 913 and switch off the first MOSFET 915 and the fourth MOSFET 914.

Referring to FIG. 10A, when the driver circuit 917 synchronously switches the first MOSFET 915, the second MOSFET 916, the third MOSFET 913, and the fourth MOSFET 914, a current smaller than a current flowing in the first circuit 1010*a* may flow through the second coil 918, the second capacitor 919, and the rectifier circuit 920. The magnitude of the current flowing in the second coil 918 may decrease as the magnitude of a mutual inductance between the first coil 911 and the second coil 918 decreases. As resonant frequencies of the second coil 918 and the second capacitor 919 are much lower than an operating frequency of the wireless power receiver 901, the magnitude of the current flowing in the second coil 918 may be smaller.

Referring to FIG. 10A, the first MOSFET 915, the second MOSFET 916, the third MOSFET 913, and the fourth MOSFET 914 may form the full bridge structure, and drains of the first MOSFET 915 and the second MOSFET 916 may be connected to the output end of the rectifier circuit 920, such that power induced in the first circuit 710*a* may be rectified by the first MOSFET 915, the second MOSFET 916, the third MOSFET 913, and the fourth MOSFET 914. The rectified power may be supplied to the output end of the rectifier circuit 920 and supplied to the capacitor 930 and the load 940.

According to various embodiments, when the driver circuit 917 switches the first MOSFET 915, the second MOSFET 916, the third MOSFET 913, and the fourth MOSFET 914 to the "off" state, power induced in the first circuit 710*a* may be rectified by body diodes of the first MOSFET 915, the second MOSFET 916, the third MOSFET 913, and the fourth MOSFET 914. The rectified power may be supplied to the output end of the rectifier circuit 920 and supplied to the capacitor 930 and the load 940.

According to various embodiments, the driver circuit 917 may switch the third MOSFET 913 and the fourth MOSFET 914 to the "on" state, and switch the first MOSFET 915 and the second MOSFET 916 to the "off" state. FIG. 10B is a diagram illustrating an equivalent circuit of the wireless power receiver 901 when the driver circuit 917 switches the third MOSFET 913 and the fourth MOSFET 914 to the "on" state and switches the first MOSFET 915 and the second MOSFET 916 to the "off" state. In FIG. 10B, a component through which current flows is indicated in black and a component through which current does not flow is indicated by a dotted line.

Referring to FIG. 10B, as current flows through the third MOSFET 913 and the fourth MOSFET 914 switched to the "on" state, the resonance circuit may include a second circuit 1010*b*, forming a closed loop of the first coil 911, the first capacitor 912, the third MOSFET 913, and the fourth MOSFET 914, and a third circuit 1020*b*, including the third MOSFET 913, the fourth MOSFET 914, the second coil 918, and the second capacitor 919. That is, current may be induced in the second circuit 1010*b* based on the magnetic field generated from the wireless power transmitter and current may be induced in the third circuit 1020*b* based on the magnetic field generated by the first coil 911, such that the resonance circuit may receive wireless power from the wireless power transmitter. The received wireless power may be rectified by the rectifier circuit 920, and the rectified wireless power may be supplied to the capacitor 930 and the load 940.

As described above, as the driver circuit 917 switches between on/off in each of the first MOSFET 915, the second MOSFET 916, the third MOSFET 913, and the fourth MOSFET 914, an operation of the resonance circuit may change. The driver circuit 917 may switch between on/off in each of the first MOSFET 915, the second MOSFET 916, the third MOSFET 913, and the fourth MOSFET 914, based on the voltage $V_{rec}$ at the output end of the rectifier circuit 920. For example, the driver circuit 917 may synchronously switch the first MOSFET 915, the second MOSFET 916, the third MOSFET 913, and the fourth MOSFET 914 when the voltage $V_{rec}$ at the output end of the rectifier circuit 920 is greater than or equal to a threshold. The driver circuit 917 may switch the third MOSFET 913 and the fourth MOSFET 914 to the "on" state and switch the first MOSFET 915 and the second MOSFET 916 to the "off" state, when the voltage $V_{rec}$ at the output end of the rectifier circuit 920 is less than the threshold.

Referring back to FIG. 9, the rectifier circuit 920 may include two diodes 921 and 922 forming the half bridge structure. According to various embodiments, unlike in FIG. 9, the rectifier circuit 920 may include two MOSFETs forming the half bridge structure. A detailed description is provided below with respect to FIG. 11 in which the rectifier circuit 920 includes two MOSFETs. According to various embodiments, unlike in FIG. 9, the rectifier circuit 920 may include four FETs or four diodes forming the full bridge structure.

According to various embodiments, the load 940 may refer to components other than the resonance circuit 910, the rectifier circuit 920, and the capacitor 930 among the components of the wireless power receiver 901. For example, the load 940 may include a DC/DC converter, an LDO regulator, a charger, and a battery.

Figure 11:
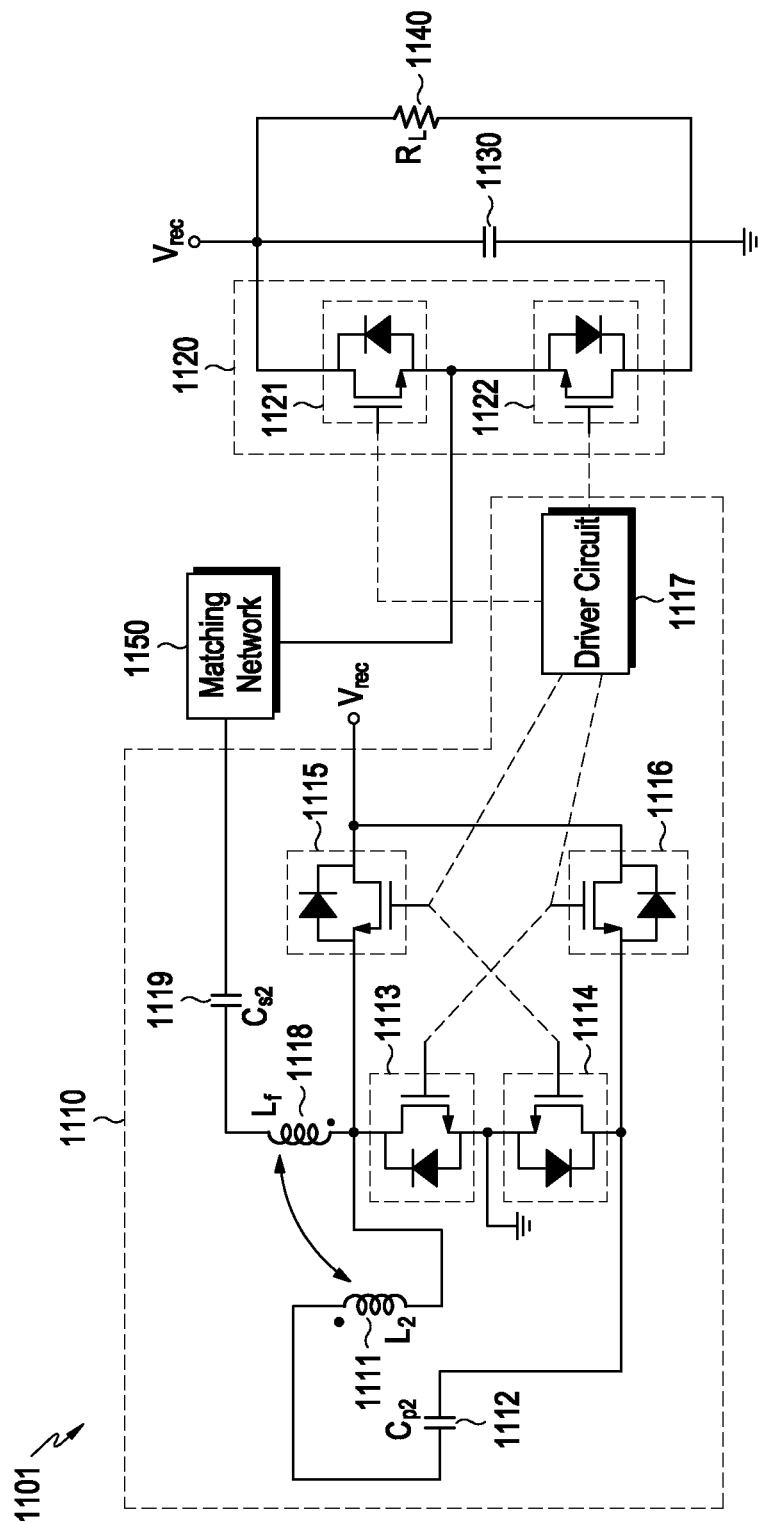
FIG. 11 is a circuit diagram illustrating a wireless power receiver, according to an embodiment.

FIG. 11 is a circuit diagram illustrating a wireless power receiver, according to an embodiment of the disclosure. A wireless power receiver 1101 of FIG. 11 is similar to the wireless power receiver 901 of FIG. 9, except that the wireless power receiver 1101 further includes a matching network 1150 and a rectifier circuit 1120, which includes two MOSFETs 1121 and 1122 instead of two diodes. Thus, the foregoing details described regarding the resonance circuit 910, the driver circuit 917, the rectifier circuit 920, the capacitor 930, and the load 940 of FIG. 9 may be equally applied to a resonance circuit 1110, a driver circuit 1117, a rectifier circuit 1120, a capacitor 1130, and load 1140 of FIG. 11.

Referring to FIG. 11, according to various embodiments, the wireless power receiver 1101 may include a matching network 1150. The rectifier circuit 1120 has a smaller impedance when having the half bridge structure than when having the full bridge structure, such that the matching network 1150 may be used to compensate for a reduced impedance. The matching network 1150 may include at least one capacitor and at least one inductor. The matching network 1150 may include two capacitors and one inductor, a first end of the matching network 1150 may be a first end of a first capacitor, a second end of the first capacitor may be connected to a first end of a second capacitor and a first end of an inductor, and a second end of the second capacitor and a second end of the inductor may be a second end of the matching network 1150.

According to various embodiments, the rectifier circuit 1120 may include two MOSFETs 1121 and 1122 forming the half bridge structure. The on/off state of each of the two MOSFETs may be controlled in an alternating manner based on a voltage applied to each of the two MOSFETs.

For example, the two MOSFETs included in the rectifier circuit 920 may be switched by the driver circuit 1117. When the voltage $V_{rec}$ at the output end of the rectifier circuit 1120 is greater than or equal to the threshold, the driver circuit 1117 may switch the two MOSFETs included in the rectifier circuit 1120 to the "off" state while synchronously switching the first MOSFET 1115, the second MOSFET 1116, the third MOSFET 1113, and the fourth MOSFET 1114 or switching the first MOSFET 1115, the second MOSFET 1116, the third MOSFET 1113, and the fourth MOSFET 1114 to the "off" state. Alternatively, when the voltage $V_{rec}$ at the output end of the rectifier circuit 1120 is less than the threshold, the driver circuit 1117 may switch the third MOSFET 1113 and the fourth MOSFET 1114 to the "on" state, switch the first MOSFET 1115 and the second MOSFET 1116 to the "off" state, and alternately switch the two MOSFETs included in the rectifier circuit 1120.

Unlike in FIG. 11, according to various embodiments, the two MOSFETs included in the rectifier circuit 920 may be controlled by a separate driver circuit other than the driver circuit 1117.

Figure 12:
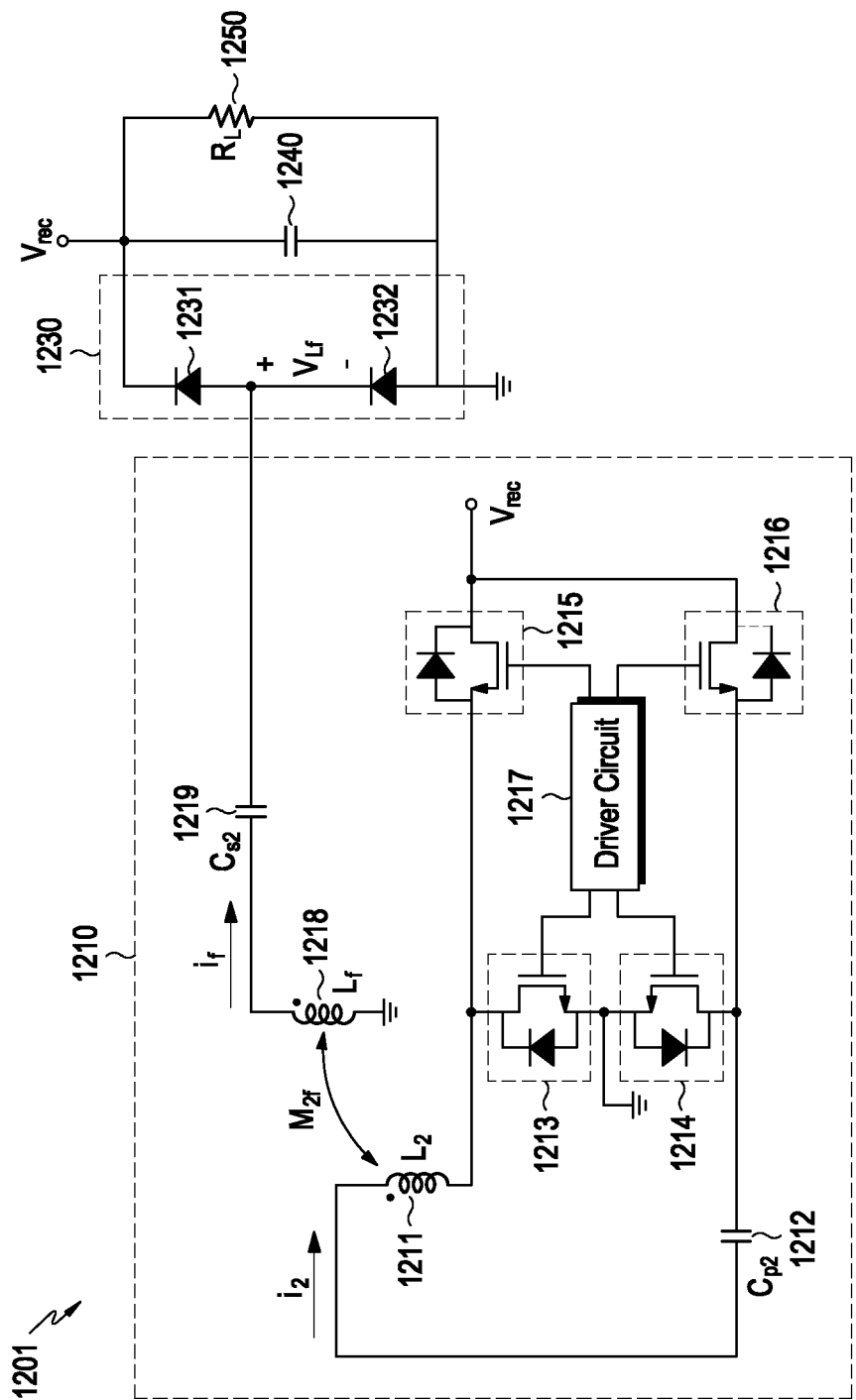
FIG. 12 is a circuit diagram illustrating a wireless power receiver, according to an embodiment.
Figure 13A:
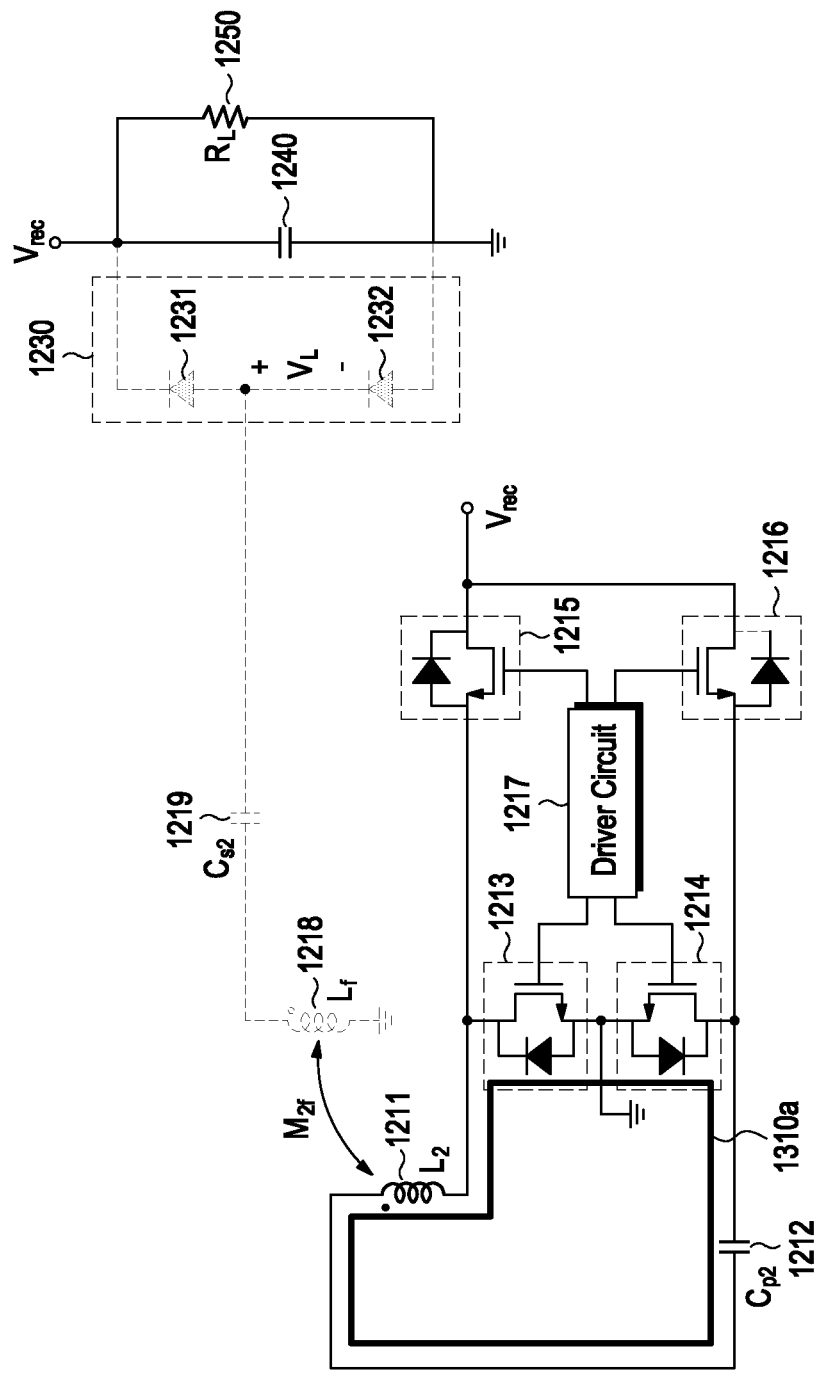
FIGS. 13A and 13B are diagrams illustrating equivalent circuits of a wireless power receiver, according to an embodiment.
Figure 13B:
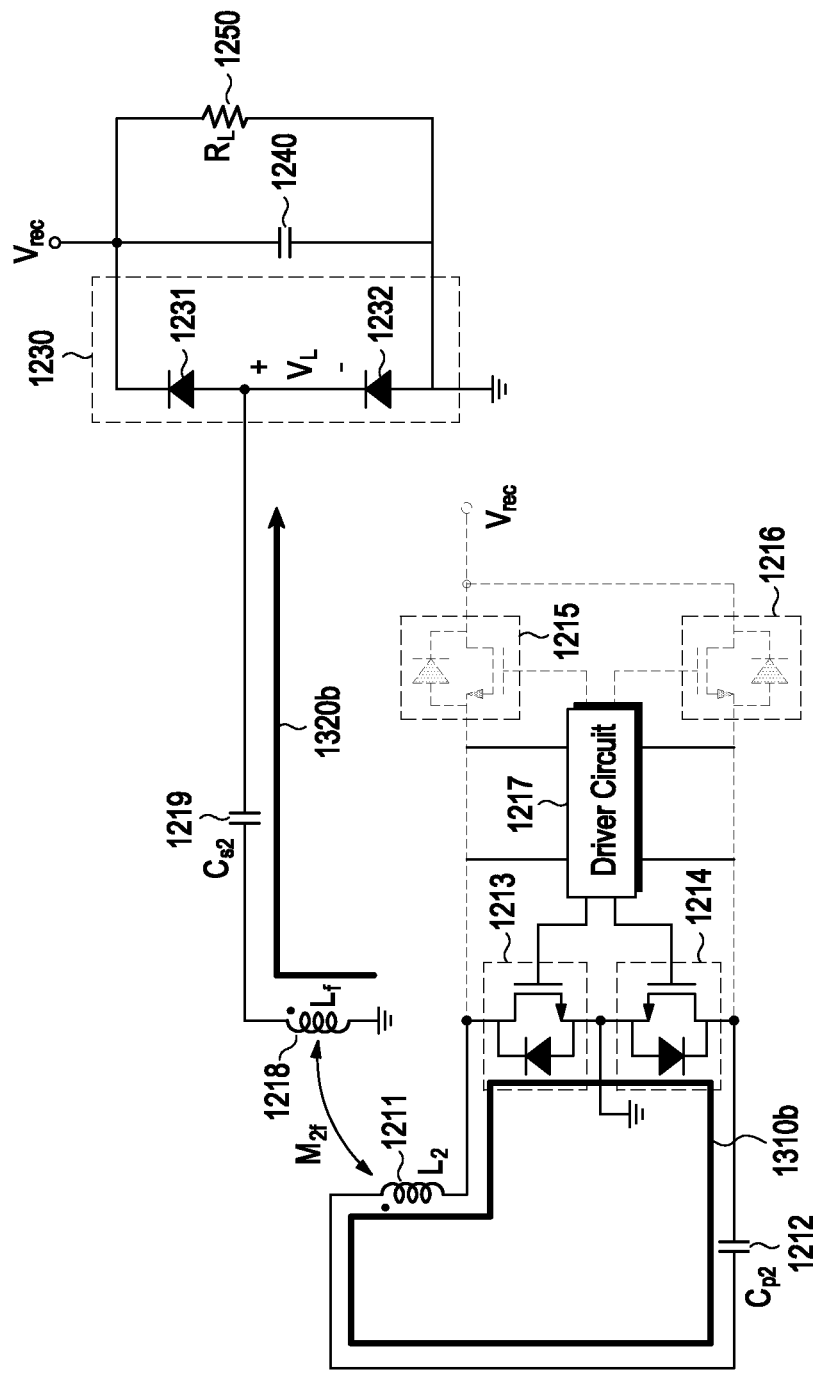

FIG. 12 is a circuit diagram illustrating a wireless power receiver, according to an embodiment of the disclosure. FIGS. 13A and 13B are diagrams illustrating equivalent circuits of the wireless power receiver shown in FIG. 12, according to an embodiment of the disclosure.

Referring to FIG. 12, a wireless power receiver 1201 may include a resonance circuit 1210, a rectifier circuit 1230, a capacitor 1240, and a load 1250.

According to various embodiments, the resonance circuit 1210 may include a first coil 1211, a first capacitor 1212, a second coil 1218, a second capacitor 1219, a first MOSFET 1215, a second MOSFET 1216, a third MOSFET 1213, a fourth MOSFET 1214, and a driver circuit 1217. The second coil 1218 may be wound such that a dot direction is indicated opposite to a direction shown in FIG. 12.

According to various embodiments, the second coil 1218 and the second capacitor 1219 may be connected in series. One end of the second coil 1218 and one end of the second capacitor 1219 that are serially connected may be connected to the ground, and the other end of the second coil 1218 and the other end of the second capacitor 1219 that are serially connected may be connected to the rectifier circuit 1230.

According to various embodiments, the first MOSFET 1215, the second MOSFET 1216, the third MOSFET 1213, and the fourth MOSFET 1214 may form the full bridge structure. Drains of the first MOSFET 1215 and the second MOSFET 1216 may be connected to an output end of the rectifier circuit 1230. Sources of the first MOSFET 1213 and the second MOSFET 1214 may be connected to the ground.

Thus, the wireless power receiver 1201 may not need an isolated gate driver circuit (e.g., the gate driver circuit 160 of FIG. 1) to drive the third MOSFET 1213 and the fourth MOSFET 1214.

According to various embodiments, the driver circuit 1217 may provide a driving signal for synchronously switching the first MOSFET 1215, the second MOSFET 1216, the third MOSFET 1213, and the fourth MOSFET 1214 to the first MOSFET 1215, the second MOSFET 1216, the third MOSFET 1213, and the fourth MOSFET 1214, respectively. The driver circuit 1217 may provide a driving signal for switching the first MOSFET 1215, the second MOSFET 1216, the third MOSFET 1213, and the fourth MOSFET 1214 to the "off" state to the first MOSFET 1215, the second MOSFET 1216, the third MOSFET 1213, and the fourth MOSFET 1214, respectively.

FIG. 13A is a diagram illustrating an equivalent circuit of the wireless power receiver 1201 when the driver circuit 1217 synchronously switches the first MOSFET 1215, the second MOSFET 1216, the third MOSFET 1213, and the fourth MOSFET 1214, or the driver circuit 617 switches the first MOSFET 1215, the second MOSFET 1216, the third MOSFET 1213, and the fourth MOSFET 1214 to the "off" state. In FIG. 13A, a component through which a relatively small current flows is indicated by a dotted line.

Referring to FIG. 13A, when the driver circuit 1217 synchronously switches the first MOSFET 1215, the second MOSFET 1216, the third MOSFET 1213, and the fourth MOSFET 1214, current may be induced in a first circuit 1310a including the first coil 1211 and the first capacitor 1212, based on the magnetic field generated from the wireless power transmitter. The current induced in the first circuit 1310a is AC, such that according to the sign of the induced current, the driver circuit may switch on the first MOSFET 1215 and the fourth MOSFET 1214 and switch off the second MOSFET 1216 and the third MOSFET 1213, or may switch on the second MOSFET 1216 and the third MOSFET 1213 and switch off the first MOSFET 1215 and the fourth MOSFET 1214.

Referring to FIG. 13A, when the driver circuit 1217 synchronously switches the first MOSFET 1215, the second MOSFET 1216, the third MOSFET 1213, and the fourth MOSFET 1214, a current smaller than a current flowing in the first circuit 1310a may flow through the second coil 1218, the second capacitor 1219, and the rectifier circuit 1230. The magnitude of the current flowing in the second coil 1218 may decrease as the magnitude of a mutual inductance $M_{2f}$ between the first coil 1211 and the second coil 1218 decreases. As resonant frequencies of the second coil 1218 and the second capacitor 1219 are much lower than an operating frequency of the wireless power receiver 1201, the magnitude of the current flowing in the second coil 1218 may be smaller.

Referring to FIG. 13A, the first MOSFET 1215, the second MOSFET 1216, the third MOSFET 1213, and the fourth MOSFET 1214 may form the full bridge structure and drains of the first MOSFET 1215 and the second MOSFET 1216 are connected to the output end of the rectifier circuit 1230, such that power induced in the first circuit 1310a may be rectified by the first MOSFET 1215, the second MOSFET 1216, the third MOSFET 1213, and the fourth MOSFET 1214. The rectified power may be supplied to the output end of the rectifier circuit 1230 and supplied to the capacitor 1240 and the load 1250.

According to various embodiments, when the driver circuit 1217 switches the first MOSFET 1215, the second MOSFET 1216, the third MOSFET 1213, and the fourth MOSFET 1214 to the "off" state, power induced in the first circuit 710a may be rectified by body diodes of the first MOSFET 1215, the second MOSFET 1216, the third MOSFET 1213, and the fourth MOSFET 1214. The rectified power may be supplied to the output end of the rectifier circuit 1230 and supplied to the capacitor 1240 and the load 1250.

According to various embodiments, the driver circuit 1217 may switch the third MOSFET 1213 and the fourth MOSFET 1214 to the "on" state and switch the first MOSFET 1215 and the second MOSFET 1216 to the "off" state.

FIG. 13B is a diagram illustrating an equivalent circuit of the wireless power receiver 1201 when the driver circuit 1217 switches the third MOSFET 1213 and the fourth MOSFET 1214 to the "on" state and switches the first MOSFET 1215 and the second MOSFET 1216 to the "off" state. In FIG. 13B, a component through which a current flows is indicated in black and a component through which a current does not flow is indicated by a dotted line.

Referring to FIG. 13B, as a current flows through the third MOSFET 1213 and the fourth MOSFET 1214 switched to the "on" state, the resonance circuit may include a second circuit 1310b, forming a closed loop of the first coil 1211, the first capacitor 1212, the third MOSFET 1213, and the fourth MOSFET 1214, and a third circuit 1320b including the second coil 1218 and the second capacitor 1219. That is, a current may be induced in the second circuit 1310b based on the magnetic field generated from the wireless power transmitter and a current may be induced in the third circuit 1320b based on the magnetic field generated by the first coil 1211, such that the resonance circuit may receive wireless power from the wireless power transmitter. The received wireless power may be rectified by the rectifier circuit 1230, and the rectified wireless power may be supplied to the capacitor 1240 and the load 1250.

As described above, as the driver circuit 1217 switches between on/off in each of the first MOSFET 1215, the second MOSFET 1216, the third MOSFET 1213, and the fourth MOSFET 1214, an operation of the resonance circuit may change. The driver circuit 1217 may control on/off in each of the first MOSFET 1213, the second MOSFET 1216, the third MOSFET 613, and the fourth MOSFET 1214, based on the voltage $V_{rec}$ at the output end of the rectifier circuit 1230. For example, the driver circuit 1217 may synchronously switch the first MOSFET 1215, the second MOSFET 1216, the third MOSFET 1213, and the fourth MOSFET 1214 when the voltage $V_{rec}$ at the output end of the rectifier circuit 1230 is greater than or equal to a threshold. The driver circuit 1217 may switch the third MOSFET 1213 and the fourth MOSFET 1214 to the "on" state and switch the first MOSFET 1215 and the second MOSFET 1216 to the "off" state, when the voltage $V_{rec}$ at the output end of the rectifier circuit 1230 is less than the threshold.

Referring back to FIG. 12, the rectifier circuit 1230 may include two diodes 1231 and 1232 forming the half bridge structure. According to various embodiments, unlike in FIG. 12, the rectifier circuit 1230 may include two MOSFETs forming the half bridge structure. According to various embodiments, unlike in FIG. 12, the rectifier circuit 1230 may include four FETs or four diodes forming the full bridge structure.

According to various embodiments, the load 1250 may refer to any component other than the resonance circuit 1210, the rectifier circuit 1230, and the capacitor 1240 among the components of the wireless power receiver 1201.

For example, the load 1250 may include a DC/DC converter, an LDO regulator, a charger, and a battery.

According to various embodiments, the wireless power receiver 601 may receive wireless power from a wireless power transmitter. The wireless power receiver 601 may include a resonance circuit configured to receive the wireless power, and including the first coil 611, the second coil 618, and the first capacitor 612. The wireless power receiver 601 may include a rectifier circuit connected to the resonance circuit, and including a first rectifier circuit and a second rectifier circuit 620 forming a full bridge structure. The wireless power receiver 601 may include the driver circuit 617. The first rectifier circuit may include the first MOSFET 615, the second MOSFET 616, the third MOSFET 613, and the fourth MOSFET 614. Sources of the first MOSFET 615 and the second MOSFET 616 are connected to both ends of a resonator in which the first coil 611 and the first capacitor 612 are connected in series. Sources of the third MOSFET 613 and the fourth MOSFET 614 are connected to ground. The driver circuit 617 is connected to gates of the first MOSFET 615, the second MOSFET 616, the third MOSFET 613, and the fourth MOSFET 614. When the driver circuit 617 switches off the first MOSFET 615 and the second MOSFET 616 and switches on the third MOSFET 613 and the fourth MOSFET 614, as a first current is induced in the resonator based on a first magnetic field generated from the wireless power transmitter and a second current is induced in the second coil 618 based on a second magnetic field generated in the resonator, the resonance circuit receives the wireless power, and the current induced in the second coil 618 may be rectified by the second rectifier circuit 630.

According to various embodiments, the second rectifier circuit 630 may include four FETs or four diodes 631, 632, 633, and 634 forming a full bridge structure.

According to various embodiments, the second rectifier circuit 630 may include two FETs or two diodes 921 and 922 forming a half bridge structure.

According to various embodiments, when the driver circuit synchronously switches the first MOSFET 615, the second MOSFET 616, the third MOSFET 613, and the fourth MOSFET 614, as the first current is induced based on the first magnetic field generated from the wireless power transmitter, the resonator may receive the wireless power, and the received wireless power may be rectified by the first rectifier circuit.

According to various embodiments, when the driver circuit 617 switches off the first MOSFET 615, the second MOSFET 616, the third MOSFET 613, the fourth MOSFET 614, as the first current is induced based on the first magnetic field generated from the wireless power transmitter, the resonator may receive the wireless power, and the received wireless power may be rectified by body diodes of the first MOSFET 615, the second MOSFET 616, the third MOSFET 613, and the fourth MOSFET 614.

According to various embodiments, when the driver circuit 617 switches off the first MOSFET 615 and the second MOSFET 616 and switches on the third MOSFET 613 and the fourth MOSFET 614, the driver circuit 617 may be configured to synchronously switch on or off the two FETs included in the second rectifier circuit 630.

According to various embodiments, the wireless power receiver may further include the matching network 1150 connected between the second coil 617 and the second rectifier circuit 630, in which the matching network 1150 may include at least one capacitor and at least one inductor.

According to various embodiments, the wireless power receiver may further include the processor 830, in which the processor 830 may be configured to control the driver circuit 617 based on the rectified wireless power.

According to various embodiments, the wireless power receiver may further include the hysteresis comparator 870, in which the hysteresis comparator 870 may be configured to generate an interrupt signal based on the rectified wireless power, and the processor 830 may be configured to control the driver circuit 617 based on the interrupt signal.

According to various embodiments, the processor 830 may be configured to control the driver circuit 617 to synchronously switch the first MOSFET 615, the second MOSFET 616, the third MOSFET 613 and the fourth MOSFET 614 or to switch off the first MOSFET 615, the second MOSFET 615, the third MOSFET 613, and the fourth MOSFET 614, when a voltage of the rectified wireless power is greater than or equal to a threshold.

According to various embodiments, the processor 830 may be configured to control the driver circuit 617 to switch off the first MOSFET 615 and the second MOSFET 616 and to switch on the third MOSFET 613 and the fourth MOSFET 614, when the voltage of the rectified wireless power is less than the threshold.

According to various embodiments, the resonance circuit may further include the second capacitor 621, the third coil 619, and the third capacitor 622. The first end of the second coil 618 may be connected to the drain of the third MOSFET 613. The second end of the second coil 618 may be connected to the first end of the second capacitor 621. The second end of the second capacitor 621 may be connected to the second rectifier circuit 630. The first end of the third coil 619 may be connected to the drain of the fourth MOSFET 614. The second end of the third coil 619 is connected to the first end of the third capacitor 622. The second end of the third capacitor 622 may be connected to the second rectifier circuit 630.

According to various embodiments, the drains of the first MOSFET 615 and the second MOSFET 616 may be connected to the output end of the rectifier circuit 630.

According to various embodiments, the resonance circuit may further include the second capacitor 919. The first end of the second coil 918 may be connected to the drain of the third MOSFET 913. The second end of the second coil 918 may be connected to the first end of the second capacitor 919. The second end of the second capacitor 919 may be connected to the second rectifier circuit 920.

According to various embodiments, the first rectifier circuit may include a first diode and a second diode in place of the first MOSFET 615 and the second MOSFET 616.

According to various embodiments, the wireless power receiver 401 may receive wireless power from a wireless power transmitter. The wireless power receiver 401 may include a resonance circuit configured to receive the wireless power, and including the first coil 411, the second coil 413, the first capacitor 412, and a bidirectional switch. The wireless power receiver 401 may include the rectifier circuit 420 connected to the resonance circuit, and a driver circuit 419. The bidirectional switch may include the first MOSFET 415 and the second MOSFET 416. Sources of the first MOSFET 415 and the second MOSFET 416 may be connected to the ground. The driver circuit 419 may be connected to the gates of the first MOSFET 415 and the second MOSFET 416. When the driver circuit 419 switches off the first MOSFET 415 and the second MOSFET 416, as a first current is induced to a first circuit including the first coil 411, the second coil 413, and the first capacitor 412 based on a first magnetic field generated from the wireless power transmitter, the resonance circuit may be configured to receive the wireless power. When the driver circuit 419 switches on the first MOSFET 415 and the second MOSFET 416, as a second current is induced in a second circuit including the first coil 411 and the first capacitor 412 based on the first magnetic field generated from the wireless power transmitter and a third current is induced in a third circuit including the second coil 413 based on a second magnetic field generated in the second circuit, the resonance circuit may be configured to receive the wireless power.

According to various embodiments, the rectifier circuit 420 may include four FETs or four diodes 421, 422, 423, and 424 forming a full bridge structure.

According to various embodiments, the rectifier circuit 420 may include two FETs or two diodes forming a half bridge structure.

According to various embodiments, the wireless power receiver 401 may further include a matching network connected to the rectifier circuit 420, in which the matching network may include at least one capacitor and at least one inductor.

According to various embodiments, the wireless power receiver 401 may further include a processor, in which the processor may be configured to control the driver circuit 419 based on the rectified wireless power.

The wireless power receiver according to various embodiments disclosed herein may be one of various types of devices. The wireless power receiver may include, for example, a portable communication device (e.g., a smart phone), a computer device, a portable multimedia device, a portable medical device, a camera, a wearable device, or a home appliance. The wireless power receiver according to an embodiment of the disclosure may not be limited to the above-listed devices.

As used in various embodiments, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., program including one or more instructions that are stored in a storage medium (e.g., internal memory or external memory) that is readable by a machine (e.g., electronic device). For example, a processor of the machine (e.g., electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or a plurality of entities, and some of the plurality of entities may be separately disposed on different components. According to various embodiments, one or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to certain embodiments thereof, it will be understood by those skilled in the art that various changes in form and detail may be made therein without departing form the scope of the disclosure. Therefore, the scope of the disclosure should not be defined as being limited to the embodiments, but should be defined by the appended claims and equivalents thereof.

What is claimed is:

1. A wireless power receiver receiving wireless power from a wireless power transmitter, the wireless power receiver comprising:
    a resonance circuit configured to receive the wireless power, and comprising a first coil, a second coil, and a first capacitor; and
    a rectifier circuit connected to the resonance circuit, and comprising a first rectifier circuit and a second rectifier circuit forming a full bridge structure; and
    a driver circuit,
    wherein the first rectifier circuit includes a first metal oxide semiconductor field-effect transistor (MOSFET), a second MOSFET, a third MOSFET and a fourth MOSFET, a first source of the first MOSFET being connected to one end of a resonator in which the first coil and the first capacitor are connected in series, a second source of the second MOSFET being connected to another end of the resonator, and sources of the third MOSFET and the fourth MOSFET being connected to ground,
    wherein the driver circuit is connected to gates of the first MOSFET, the second MOSFET, the third MOSFET, and the fourth MOSFET, and
    wherein, when the driver circuit switches off the first MOSFET and the second MOSFET and switches on the third MOSFET and the fourth MOSFET, as a first current is induced in the resonator based on a first magnetic field generated from the wireless power transmitter and a second current is induced in the second coil based on a second magnetic field generated in the resonator, the resonance circuit receives the wireless power, and the second current induced in the second coil is rectified by the second rectifier circuit.

2. The wireless power receiver of claim 1, wherein the second rectifier circuit comprises four field effect transistors (FETs) or four diodes forming a full bridge structure.

3. The wireless power receiver of claim 1, wherein the second rectifier circuit comprises two FETs or two diodes forming a half bridge structure.

4. The wireless power receiver of claim 1, wherein, when the driver circuit synchronously switches the first MOSFET, the second MOSFET, the third MOSFET and the fourth MOSFET, as the first current is induced based on the first magnetic field generated from the wireless power transmitter, the resonator receives the wireless power, and the received wireless power is rectified by the first rectifier circuit.

5. The wireless power receiver of claim 1, wherein, when the driver circuit switches off the first MOSFET, the second MOSFET, the third MOSFET and the fourth MOSFET, as the first current is induced based on the first magnetic field generated from the wireless power transmitter, the resonator receives the wireless power, and the received wireless power is rectified by body diodes of the first MOSFET, the second MOSFET, the third MOSFET and the fourth MOSFET.

6. The wireless power receiver of claim 3, wherein, when the driver circuit switches off the first MOSFET and the second MOSFET and switches on the third MOSFET and the fourth MOSFET, the driver circuit is configured to synchronously switch on or off of the two FETs included in the second rectifier circuit.

7. The wireless power receiver of claim 1, further comprising a matching network connected between the second coil and the second rectifier circuit,
wherein the matching network includes at least one capacitor and at least one inductor.

8. The wireless power receiver of claim 1, further comprising a processor,
wherein the processor is configured to control the driver circuit based on the rectified wireless power.

9. The wireless power receiver of claim 8, further comprising a hysteresis comparator,
wherein the hysteresis comparator is configured to generate an interrupt signal based on the rectified wireless power, and
wherein the processor is configured to control the driver circuit based on the interrupt signal.

10. The wireless power receiver of claim 8, wherein the processor is configured to control the driver circuit to synchronously switch the first MOSFET, the second MOSFET, the third MOSFET and the fourth MOSFET, or to switch off the first MOSFET, the second MOSFET, the third MOSFET and the fourth MOSFET, when a voltage of the rectified wireless power is greater than or equal to a threshold.

11. The wireless power receiver of claim 8, wherein the processor is configured to control the driver circuit to switch off the first MOSFET and the second MOSFET and to switch on the third MOSFET and the fourth MOSFET, when a voltage of the rectified wireless power is less than a threshold.

12. The wireless power receiver of claim 1, wherein:
the resonance circuit further includes a second capacitor, a third coil, and a third capacitor,
a first end of the second coil is connected to a drain of the third MOSFET,
a second end of the second coil is connected to a first end of the second capacitor,
a second end of the second capacitor is connected to the second rectifier circuit,
a first end of the third coil is connected to a drain of the fourth MOSFET,
a second end of the third coil is connected to a first end of the third capacitor, and
a second end of the third capacitor is connected to the second rectifier circuit.

13. The wireless power receiver of claim 1, wherein a drain of the first MOSFET and a drain of the second MOSFET are connected to an output end of the second rectifier circuit.

14. The wireless power receiver of claim 1, wherein:
the resonance circuit further comprises a second capacitor,
a first end of the second coil is connected to a drain of the third MOSFET,
a second end of the second coil is connected to a first end of the second capacitor, and
a second end of the second capacitor is connected to the second rectifier circuit.

15. The wireless power receiver of claim 1, wherein the first rectifier circuit comprises a first diode and a second diode in place of the first MOSFET and the second MOSFET.

16. A wireless power receiver receiving wireless power from a wireless power transmitter, the wireless power receiver comprising:
a resonance circuit configured to receive the wireless power, and comprising a first coil, a second coil, a first capacitor, and a bidirectional switch;
a rectifier circuit connected to the resonance circuit; and
a driver circuit,
wherein the bidirectional switch includes a first metal oxide semiconductor field-effect transistor (MOSFET) and a second MOSFET, sources of the first MOSFET and the second MOSFET being connected to the ground,
wherein the driver circuit is connected to gates of the first MOSFET and the second MOSFET,
wherein, when the driver circuit switches off the first MOSFET and the second MOSFET, as a first current is induced to a first circuit comprising the first coil, the second coil and the first capacitor based on a first magnetic field generated from the wireless power transmitter, the resonance circuit receives the wireless power, and
wherein when the driver circuit switches on the first MOSFET and the second MOSFET, as a second current is induced in a second circuit comprising the first coil and the first capacitor based on the first magnetic field generated from the wireless power transmitter and a third current is induced in a third circuit comprising the second coil based on a second magnetic field generated in the second circuit, the resonance circuit receives the wireless power.

17. The wireless power receiver of claim 16, wherein the rectifier circuit comprises four field effect transistors (FETs) or four diodes forming a full bridge structure.

18. The wireless power receiver of claim 16, wherein the rectifier circuit comprises two FETs or two diodes forming a half bridge structure.

19. The wireless power receiver of claim 18, further comprising a matching network connected to the rectifier circuit,
   wherein the matching network includes at least one capacitor and at least one inductor.

20. The wireless power receiver of claim 16, further comprising a processor,
   wherein the processor is configured to control the driver circuit based on the rectified wireless power.

* * * * *